US012793671B2

(12) United States Patent
Zhang et al.

(10) Patent No.: US 12,793,671 B2
(45) Date of Patent: Nov. 10, 2026

(54) DDIC FALLBACK SCALING FOR PARTIAL FRAME UPDATE

(71) Applicant: QUALCOMM Incorporated, San Diego, CA (US)

(72) Inventors: Nan Zhang, Beijing (CN); Wenkai Yao, Beijing (CN); Yongjun Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 19/159,940

(22) PCT Filed: Apr. 27, 2023

(86) PCT No.: PCT/CN2023/091035

§ 371 (c)(1),
(2) Date: Aug. 26, 2025

(87) PCT Pub. No.: WO2024/221309

PCT Pub. Date: Oct. 31, 2024

(65) Prior Publication Data

US 2026/0229200 A1 Aug. 6, 2026

(51) Int. Cl.
*G09G 5/00* (2006.01)

(52) U.S. Cl.
CPC ......... *G09G 5/003* (2013.01); *G09G 2310/04* (2013.01); *G09G 2340/0407* (2013.01)

(58) Field of Classification Search
CPC ....... G09G 2310/04; G09G 2340/0407; G09G 5/003
See application file for complete search history.

(56) References Cited

U.S. PATENT DOCUMENTS 6,536,043 B1 * 3/2003 Guedalia .......... H04N 21/47205 348/E7.071
2019/0087144 A1 * 3/2019 Yadav ..................... G06F 3/147
2020/0226964 A1 7/2020 Marchya et al.
2021/0027752 A1 * 1/2021 Holmes .............. G02B 27/0093
2022/0036853 A1 2/2022 Bae et al.
2022/0351679 A1 11/2022 Yang et al.

FOREIGN PATENT DOCUMENTS

CN 104243440 A 12/2014
WO 2020191516 A1 10/2020

OTHER PUBLICATIONS

International Search Report and Written Opinion—PCT/CN2023/091035—ISA/CN—Oct. 20, 2023.

* cited by examiner

*Primary Examiner* — Muhammad N Edun
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for DDIC fallback scaling for a partial frame update. A processor may detect that a partial frame update is to occur with respect to a frame, where the frame is at a first resolution. The processor may determine, based on the detection that the partial frame update is to occur, to switch a scaling for the frame from a display processor to a DDIC. The processor may output, for the DDIC and based on the detection that the partial frame update is to occur, an indication that the DDIC is to scale the frame to a second resolution.

20 Claims, 15 Drawing Sheets

DDIC FALLBACK SCALING FOR PARTIAL FRAME UPDATE

CROSS-REFERENCE TO RELATED APPLICATION

This application is a 371 National Stage of PCT Application No. PCT/CN2023/091035, filed on Apr. 27, 2023, entitled "DDIC FALLBACK SCALING FOR PARTIAL FRAME UPDATE", and assigned to the assignee hereof. The disclosure of the prior Application is considered part of and is incorporated by reference into this Patent Application.

TECHNICAL FIELD

The present disclosure relates generally to processing systems, and more particularly, to one or more techniques for display processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques for partial frame updates may not address issues pertaining to resolution scaling. There is a need for improved techniques pertaining to partial frame updates and resolution scaling.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus includes a memory; and at least one processor coupled to the memory and, based at least in part on information stored in the memory, the at least one processor is configured to: detect that a partial frame update is to occur with respect to a frame, where the frame is at a first resolution; determine, based on the detection that the partial frame update is to occur, to switch a scaling for the frame from a display processor to a display driver integrated circuit (DDIC); and output, for the DDIC and based on the determination to switch the scaling for the frame from the display processor to the DDIC, an indication that the DDIC is to scale the frame to a second resolution.

In an aspect of the disclosure, a method, a computer-readable medium, and an apparatus are provided. The apparatus includes a memory; and at least one processor coupled to the memory and, based at least in part on information stored in the memory, the at least one processor is configured to: obtain a first indication that scaling for a frame is to be switched to a display driver integrated circuit (DDIC), where a partial frame update is associated with the frame, and where the scaling for the frame is performed at a display processor prior to the obtainment of the first indication; obtain a second indication that the DDIC is to scale the frame; obtain the frame at a first resolution; and scale the frame from the first resolution to a second resolution based on the first indication and the second indication.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
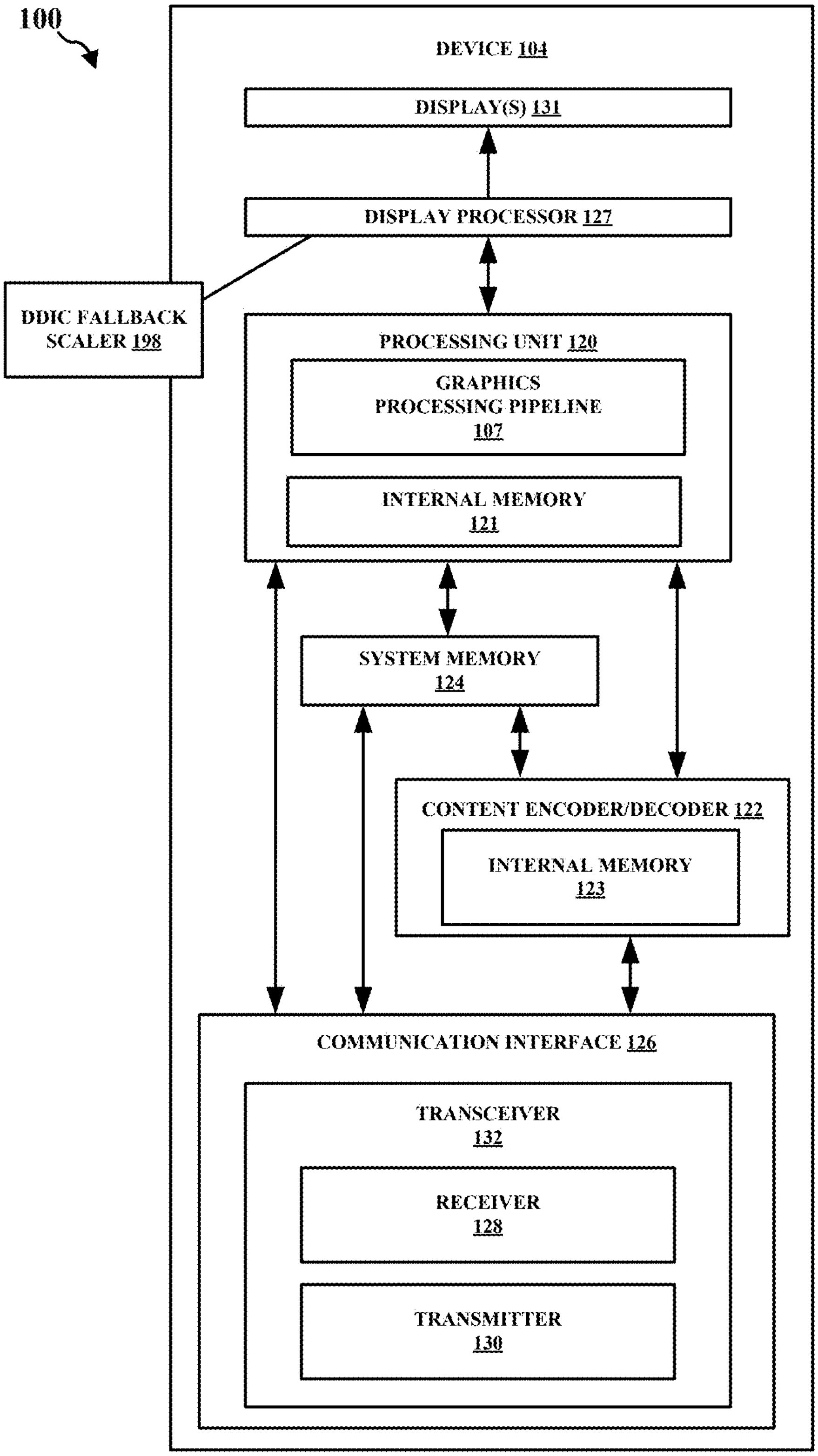
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

A device (e.g., a smartphone) may render and compose layers/frames of graphical content at a first resolution (e.g., 1080×2400) associated with an operating system (OS) of the device. The device may then upscale the graphical content from the first resolution to a second resolution (e.g., 1400×3200) associated with a physical display panel of the device, where the second resolution is greater than the first resolution. Rendering and composing graphical content at the first resolution and then upscaling the graphical content to the second resolution may enable the graphical content to be displayed on a wide variety of different devices with different processing/display capabilities. The device may perform upscaling via a display processing unit (DPU) of the device. Upscaling via a DPU (as opposed to a component associated with a display panel, such as a DDIC) may provide for a consistent visual quality across different devices, as different panels may have different DDICs with different characteristics. Furthermore, a device (e.g., a smartphone) may perform a partial frame update in order to conserve battery power of the device and/or computing resources of the device. A partial frame update may refer to (1) updating a part of a frame on a display panel (and not remaining parts of the frame) to display updated graphical content or (2) updating a first frame (or a part of a first frame) on a first display panel of a device and not updating a second frame on a second display panel of the device. Performing a partial frame update concurrently with resolution scaling via a DPU may cause portions of displayed graphical content associated with the partial frame update to flicker due to a delta error associated with pixels bordering the portions of the displayed graphical content associated with the partial frame update. Furthermore, some devices may be unable to perform a partial frame update concurrently with resolution scaling via the DPU due to the aforementioned flickering.

Various technologies pertaining to DDIC fallback scaling for partial frame updates are disclosed herein. In an example, an apparatus (e.g., a CPU) detects that a partial frame update is to occur with respect to a frame, where the frame is at a first resolution. The apparatus determines, based on the detection that the partial frame update is to occur, to switch a scaling for the frame from a display processor to a display driver integrated circuit (DDIC). The apparatus output, for the DDIC and based on the determination to switch the scaling for the frame from the display processor to the DDIC, an indication that the DDIC is to scale the frame to a second resolution. Vis-á-vis determining to switch the scaling for the frame and outputting the indication that the DDIC is to scale the frame to the second resolution, the apparatus may enable a partial frame update and resolution upscaling to be performed in a manner that reduces or eliminates flicker. Additionally, the above-described technologies may avoid complex processing associated with reducing flicker. Furthermore, the above-described technologies may reduce power consumption of a device (via a partial frame update) while at the same time providing graphical content to a user at a relatively high resolution (e.g., 1400×3200).

The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, a GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a DDIC fallback scaler 198 configured to detect that a partial frame update is to occur with respect to a frame, where the frame is at a first resolution; determine, based on the detection that the partial frame update is to occur, to switch a scaling for the frame from a display processor to a display driver integrated circuit (DDIC); and output, for the DDIC and based on the determination to switch the scaling for the frame from the display processor to the DDIC, an indication that the DDIC is to scale the frame to a second resolution. Although the following description may be focused on display processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit or bits that indicate which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
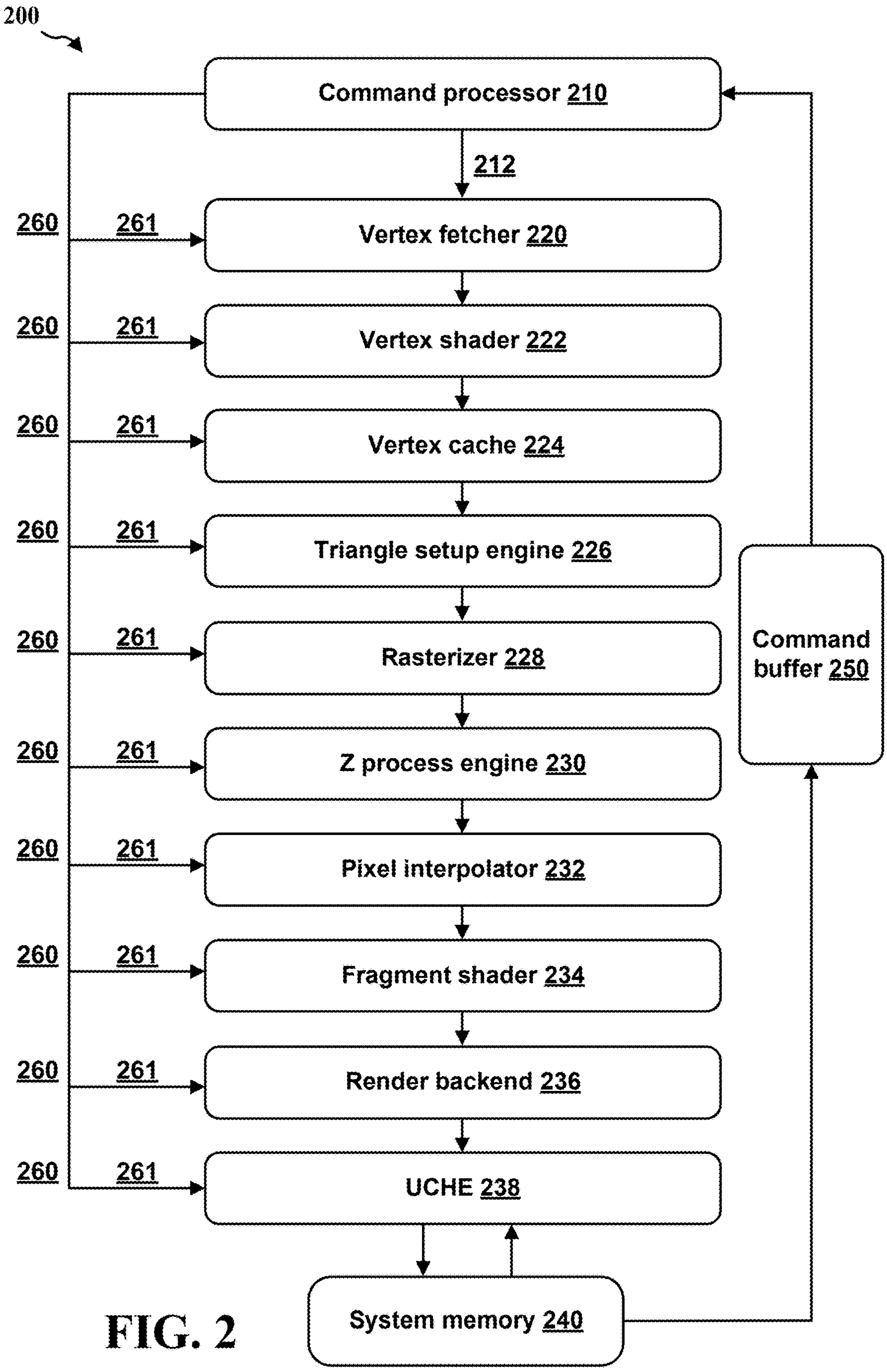
FIG. 2 illustrates an example graphics processor (e.g., a graphics processing unit (GPU)) in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call packets 212 through separate paths to the processing units or blocks in the GPU. Further, the command buffer 250 can alternate different states of context registers and draw calls. For example, a command buffer can simultaneously store the following information: context register of context N, draw call(s) of context N, context register of context N+1, and draw call(s) of context N+1.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible so that the non-visible primitives are not rendered, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a binning, a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to remove primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
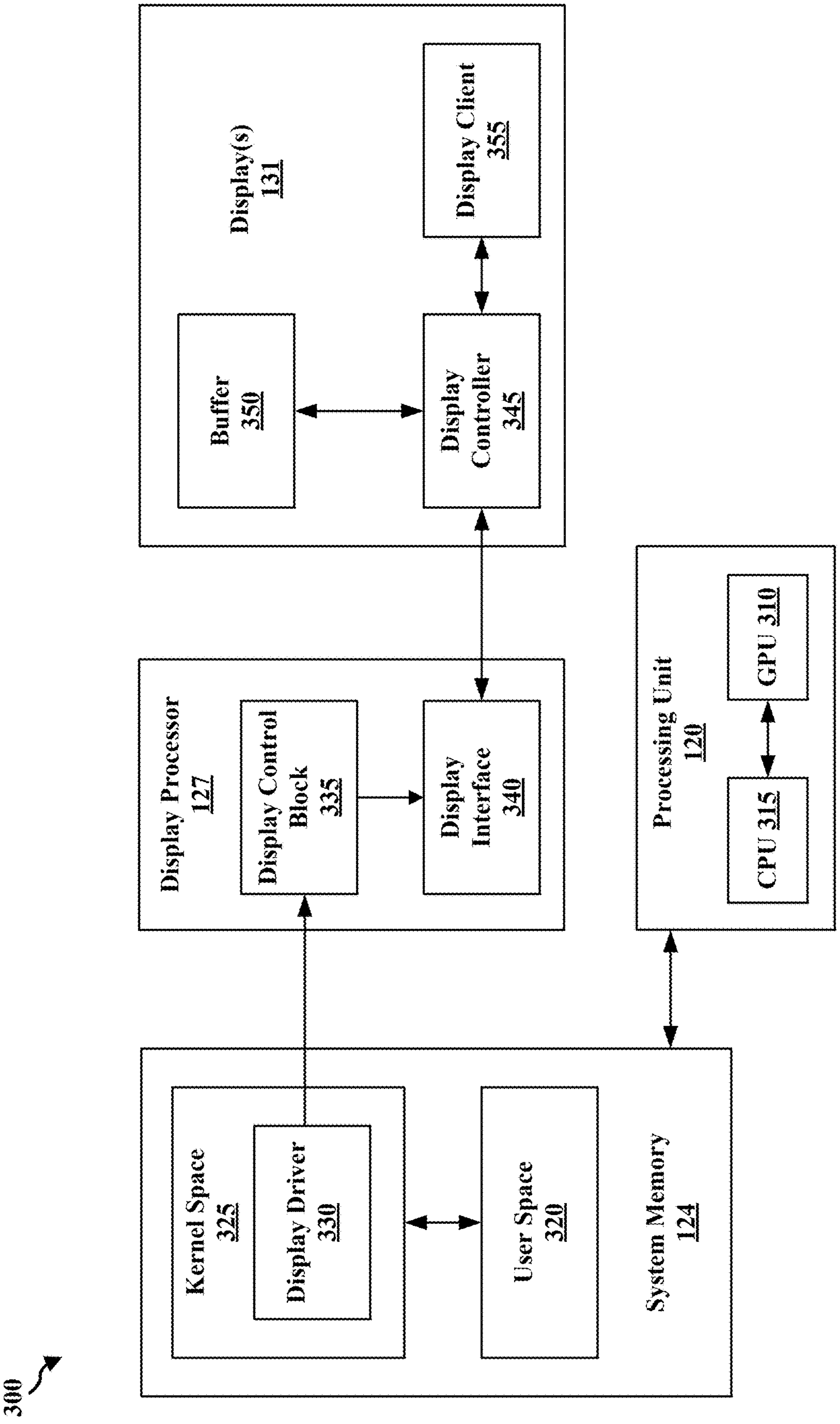
FIG. 3 illustrates an example display framework including a display processor and a display GPU in accordance with one or more techniques of this disclosure.

FIG. 3 is a block diagram 300 that illustrates an example display framework including the processing unit 120, the system memory 124, the display processor 127, and the display(s) 131, as may be identified in connection with the device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display(s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some aspects of display processing may utilize different types of mask layers, e.g., a shape mask layer. A mask layer is a layer that may represent a portion of a display or display panel. For instance, an area of a mask layer may correspond to an area of a display, but the entire mask layer may depict a portion of the content that is actually displayed at the display or panel. For example, a mask layer may include a top portion and a bottom portion of a display area, but the middle portion of the mask layer may be empty. In some examples, there may be multiple mask layers to represent different portions of a display area. Also, for certain portions of a display area, the content of different mask layers may overlap with one another. Accordingly, a mask layer may represent a portion of a display area that may or may not overlap with other mask layers.

As used herein, a DDIC may refer to an integrated circuit chip that controls a switching and a display method of a display panel. As used herein, a frame may refer to a set of pixels that form an image when displayed. Frames may be presented sequentially in order to display video. As used herein, a DPU may refer to hardware that converts information from a CPU and/or a GPU to information that can be displayed on a display. As used herein with respect to a display, a display panel, or a panel, resolution may refer to a number of horizontal pixels and a number of vertical pixels that can be presented on the display, the display panel, or the panel. As used herein with respect to a frame, resolution may refer to a number of horizontal pixels and a number of vertical pixels in a frame. As used herein, scaling may refer to changing a resolution of a frame from a first resolution to a second resolution. As used herein, refresh rate may refer to a number of times per second that a display, a display panel, or a panel draws a new image. As used herein, a DDIC hardware scaler may refer to a component of a DDIC that is responsible for scaling frames. As used herein, the term scaling functionality may refer to an ability at a DPU to scale frames.

Figure 4:
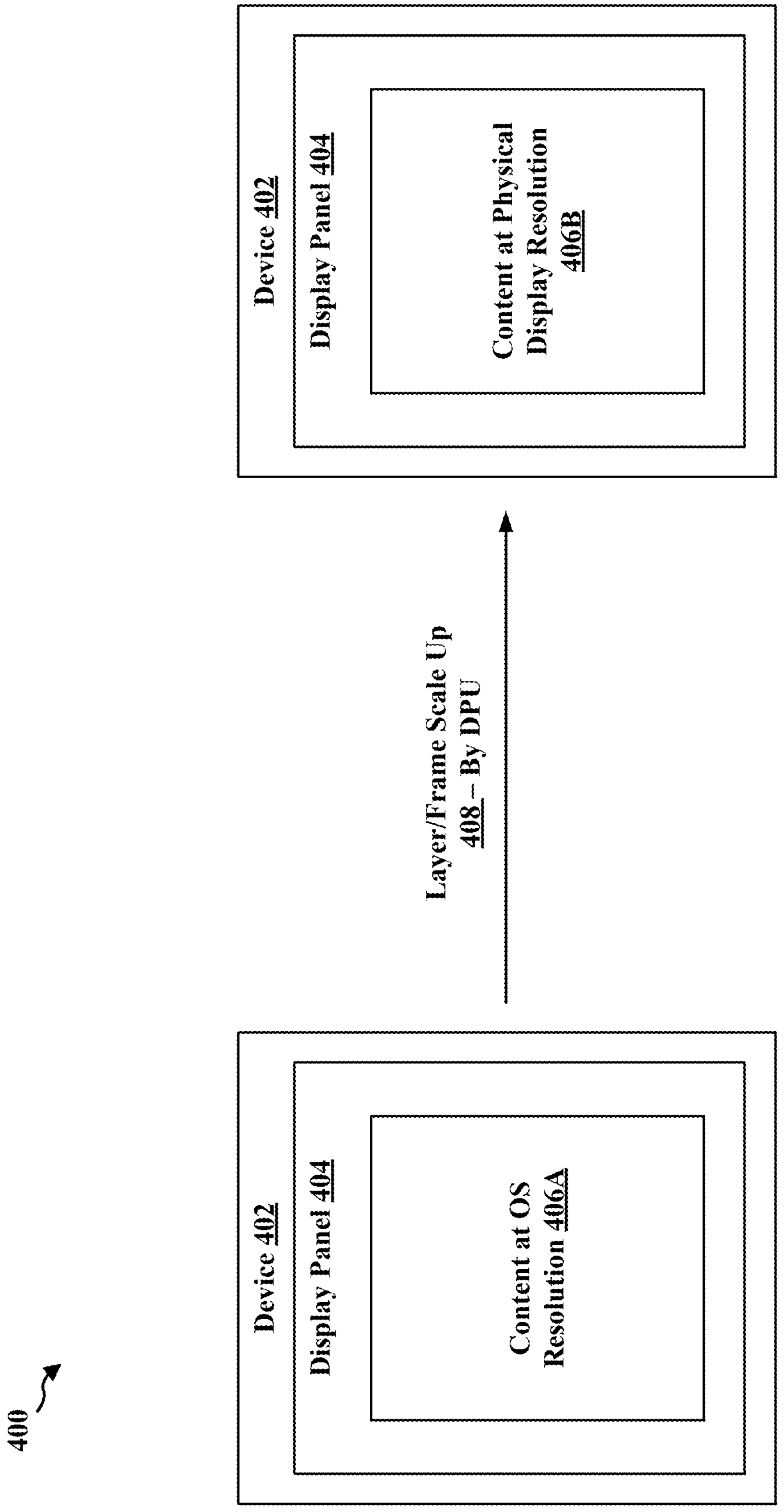
FIG. 4 is a diagram illustrating an example of resolution scaling in accordance with one or more techniques of this disclosure.

FIG. 4 is a diagram 400 illustrating an example of resolution scaling in accordance with one or more techniques of this disclosure. A device (e.g., a smartphone, a tablet, etc.) may render and compose content at a first resolution (e.g., a default OS resolution), that is, some, most, or all of layers and/or frames of the content may be rendered and composed at the first resolution. However, when the content is displayed on a display panel (e.g., an organic light emitting diode (OLED) display panel) of the device, the device may upscale the content to a second resolution (e.g., a physical resolution of the display panel) that is greater than the first resolution. In an example, the first resolution may be 1080 pixels by 2400 pixels (1080×2400) at a 120 Hz refresh rate and the second resolution may be 1440 pixels by 3200 pixels (1440×3200) at a 120 Hz refresh rate. In the example, a host DPU of the device may scale up the content from a 1080×2400 resolution to a 1440×3200 resolution and the host DPU may update/refresh the display panel (i.e., a physical display) accordingly. The host DPU may perform the scaling in order to achieve a suitable performance/power trade-off due to layer rendering/composition being performed at the 1080×2400 resolution (also referred to as 1080 p resolution). The host DPU may be utilized for scaling instead of a DDIC, as the host DPU may provide for increased visual quality scaling in comparison to scaling performed by the DDIC. Furthermore, the host DPU may provide for consistent visual quality across different devices, as different devices may have different DDICs that may have varying performance characteristics.

In an example, a device 402 (e.g., the device 104) may include a display panel 404 (e.g., the display(s) 131). The device 402 may render and compose content at an OS resolution 406A (e.g., 1080×2400) of the device 402. The device 402 may perform a layer/frame scale up 408 in order to scale the content from the OS resolution 406A to a physical display resolution 406B (e.g., 1440×3200) of the device 402. The device 402 may display the content at the physical display resolution 406B.

Figure 5:
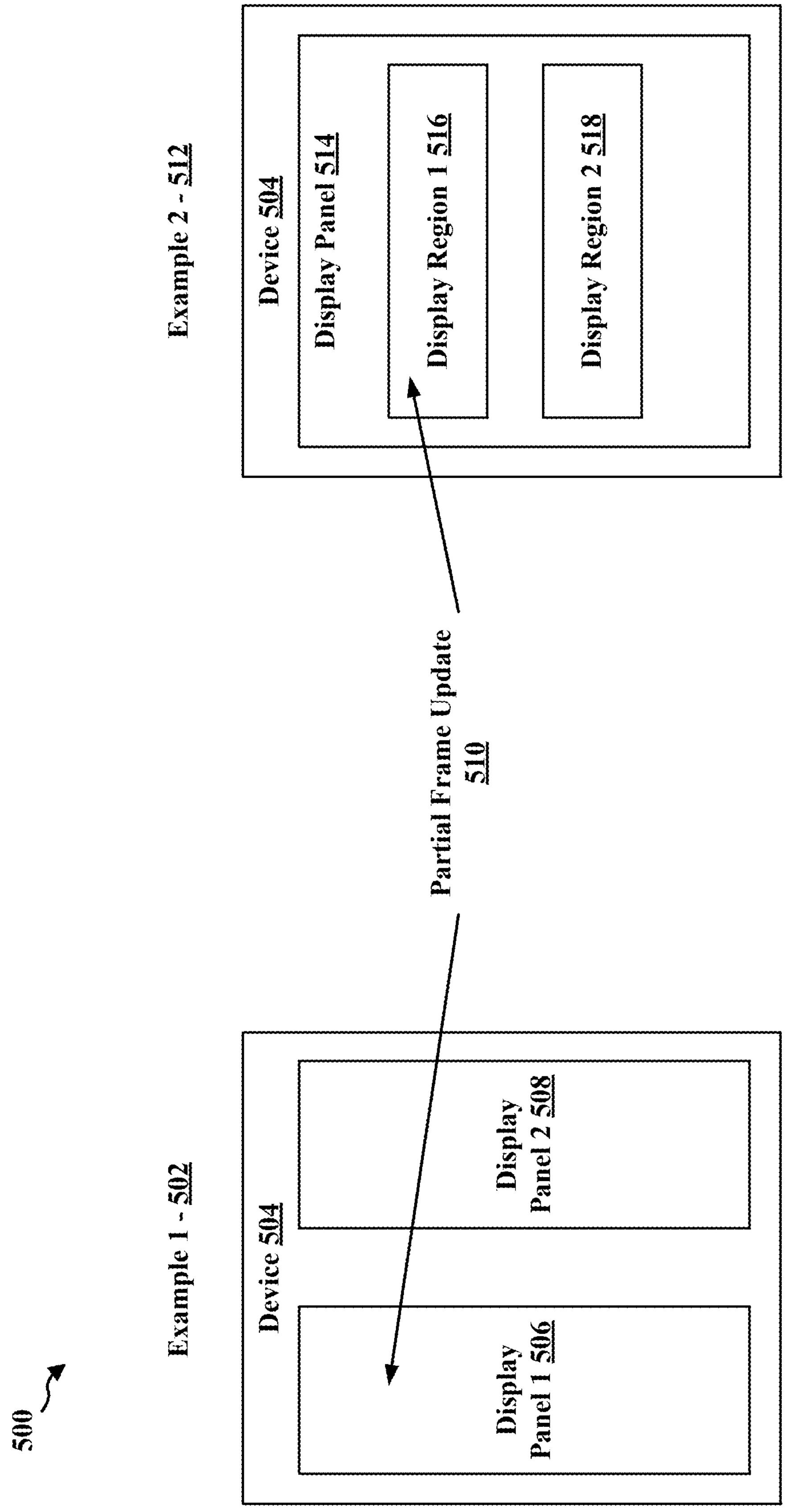
FIG. 5 is a diagram illustrating a partial frame update in accordance with one or more techniques of this disclosure.

FIG. 5 is a diagram 500 illustrating a partial frame update in accordance with one or more techniques of this disclosure. A partial frame update may refer to (1) updating a part of a frame on a display panel (and not remaining parts of the frame) to display updated content or (2) updating a first frame (or a part of a first frame) on a first display panel of a display device and not updating a second frame on a second display panel of the display device. A partial frame update may be utilized for power saving at a device. For instance, as display panels for mobile devices increase in size and as resolution sizes of the display panels increase, parts of frames may change. As such, pixels in changing areas may be refreshed/updated while pixels in non-changing areas may not be refreshed/updated. Partial frame updates may be utilized on folding-screen devices (i.e., a device with a first display panel and a second display panel that may fold at a pivot point).

In a first example 502, a device 504 (e.g., the device 104) may include a first display panel 506 that displays first content and a second display panel 508 that displays second content. The device 504 may obtain an indication that the first content (or a portion thereof) on the first display panel 506 is to be updated. The device 504 may perform a partial frame update 510 with respect to the first content (or the portion thereof) displayed on the first display panel 506 (and not the second content displayed on the second display panel 508).

In a second example 512, the device 504 may include a display panel 514. The display panel 514 may include a first display region 516 that displays first content and a second display region 518 that displays second content. In an example, the first content may be a video being played on the device 504 and the second content may be user interface (UI) controls for a video player playing the video on the device 504. The device 504 may perform the partial frame update 510 with respect to the first content displayed in the first display region 516 in order to display subsequent frames of the video, while the second content in the second display region 518 may remain static.

Figure 6:
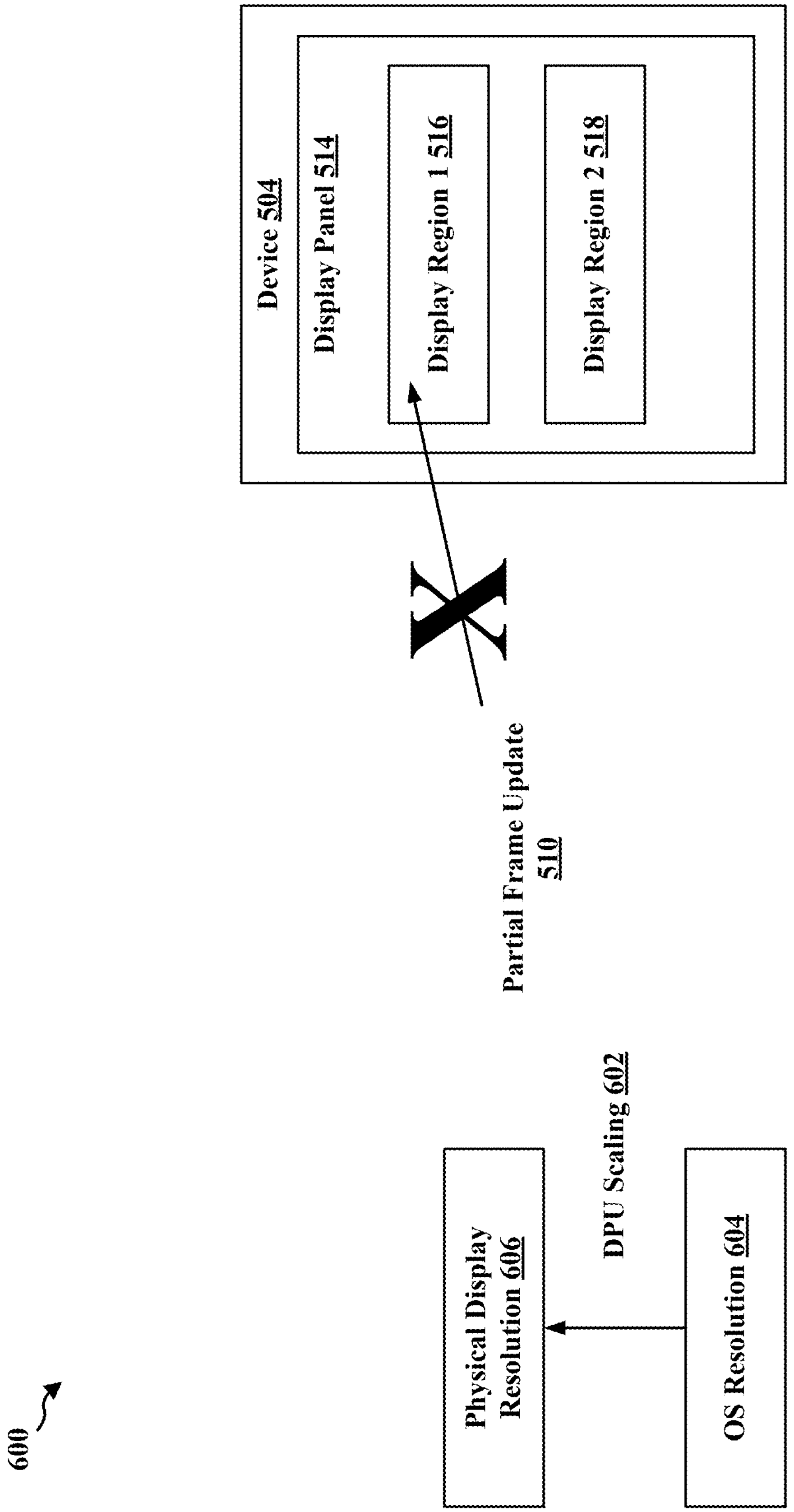
FIG. 6 is a diagram illustrating aspects pertaining to resolution scaling performed by a display processing unit (DPU) in accordance with one or more techniques of this disclosure.

FIG. 6 is a diagram 600 illustrating aspects pertaining to resolution scaling performed by a DPU in accordance with one or more techniques of this disclosure. Imaging scaling may be based on local and/or convolution-based processing. For instance, when performing image scaling, each scaled pixel value may be determined from neighbor region pixels (i.e., pixels that neighbor a scaled pixel). In an example, the neighbor region pixels for a pixel may be a 2*2 region of pixels surrounding the pixel or a 3*3 region of pixels surrounding the pixel. When a partial frame update is performed with scaling via a DPU, regions bordering a pixel may have flicker due to a delta error associated with pixels in the regions. Resolution scaling by a DPU may be a default configuration for a device, and as a result, the device may not perform a partial frame update with scaling due to the aforementioned flicker.

In an example, the device 504 may perform DPU scaling 602 in order to scale content from an OS resolution 604 to a physical display resolution 606. However, as noted above, when the DPU scaling 602 is performed, the device 504 may be unable to perform the partial frame update 510 due to flicker.

Figure 7A:
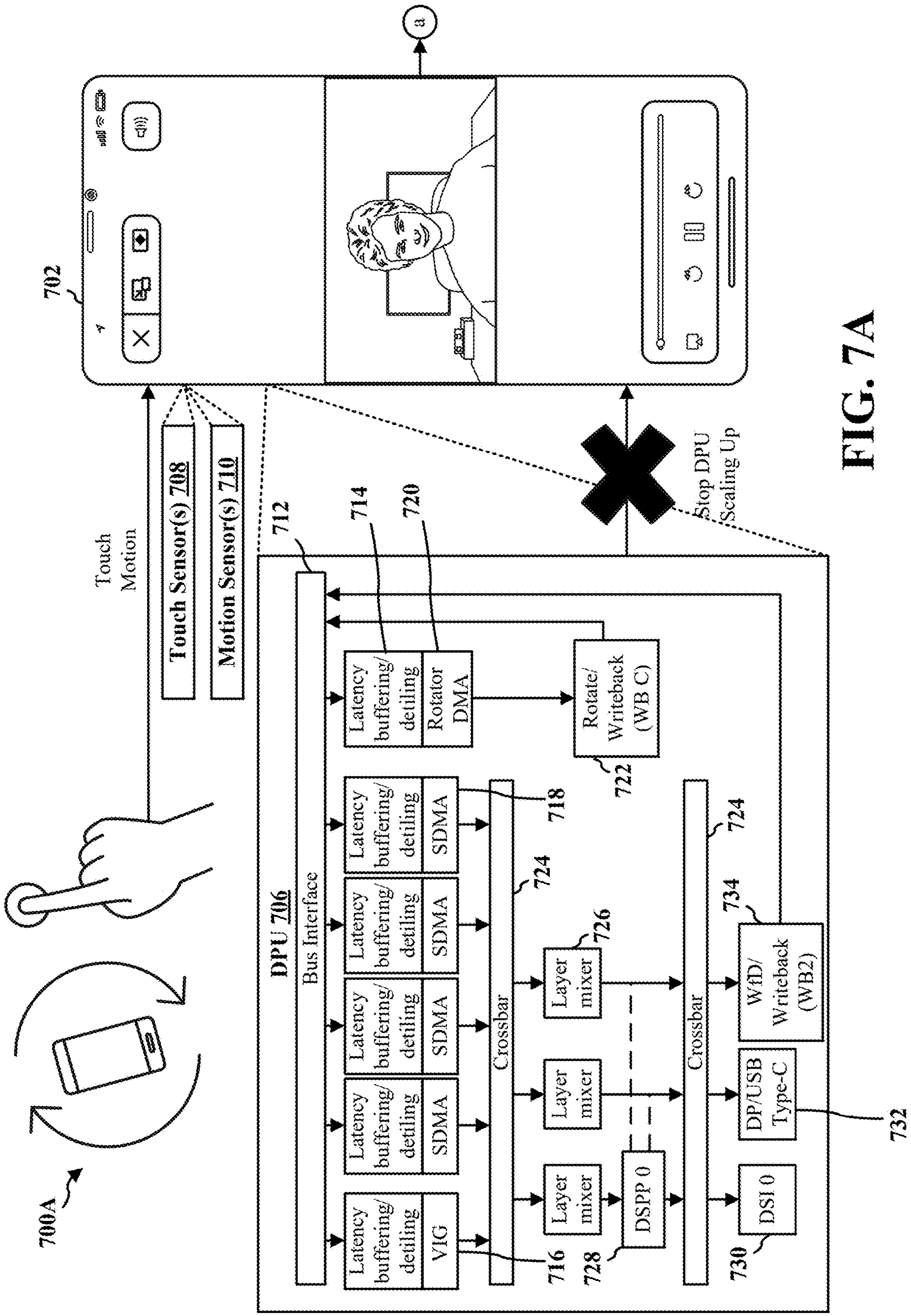
FIG. 7A is a diagram illustrating example aspects pertaining to partial frame update display driver integrated circuit (DDIC) scaling in accordance with one or more techniques of this disclosure.
Figure 7B:
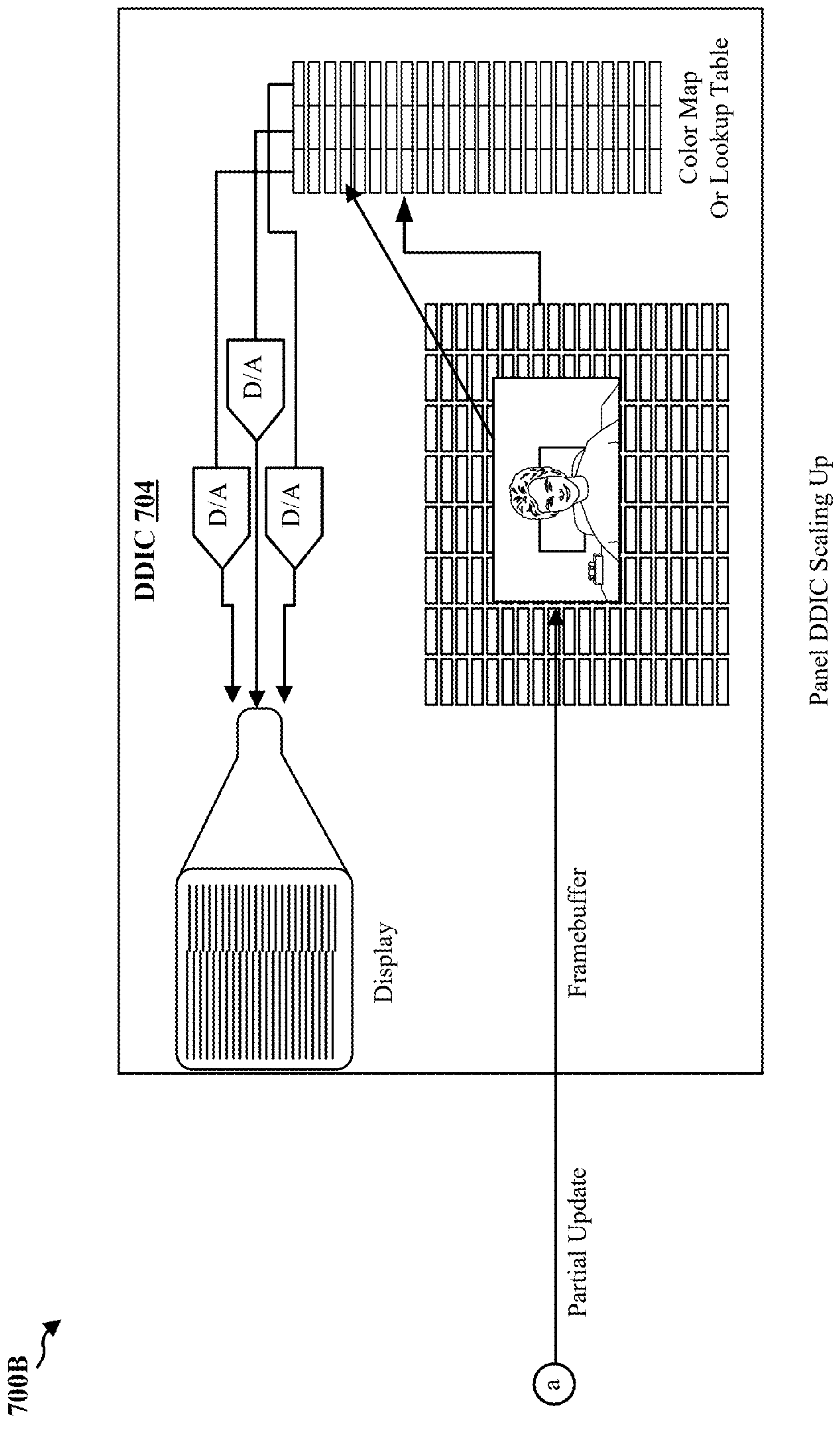
FIG. 7B is a diagram illustrating example aspects pertaining to partial frame update DDIC scaling in accordance with one or more techniques of this disclosure.

FIG. 7A is a diagram 700A illustrating example aspects pertaining to partial frame update DDIC scaling in accordance with one or more techniques of this disclosure. FIG. 7B is a diagram 700B illustrating example aspects pertaining to partial frame update DDIC scaling in accordance with one or more techniques of this disclosure. Referring jointly now to FIGS. 7A-7B and as will be discussed in detail below, a device 702 (e.g., a smartphone, the device 104) may "fall back" to display panel DDIC resolution scaling while performing a partial frame update in order to provide partial frame update and resolution scaling concurrency. The device 702 may utilize the DDIC resolution scaling while performing the partial frame update when a display panel of the device 702 is operating in command mode (i.e., operations in which transactions are associated with sending commands/data to a peripheral device, such as a display module that incorporates a display controller), as opposed to operating in video mode (i.e., operations in which transfers from a host processor to a peripheral device correspond to a real-time pixel stream).

DPU driver software executed by a CPU of the device 702 may detect that a partial frame update is to occur at a DDIC 704 of the device. The DPU driver software may apply temporal filtering based on the detection. For instance, the DPU driver software may determine a time period for which partial frame updates (including the partial frame update) are to occur at the DDIC in order to avoid frequent switching between DPU resolution scaling and DDIC resolution scaling. In an example, the time period may be greater than or equal to a threshold time period. In an example, the threshold time period may range from 250-1500 ms. For instance, the threshold time period may be 250 ms, 500 ms, 750 ms, 1000 ms, 1250 ms, or 1500 ms.

In one aspect, the device 702 may include touch sensor(s) 708 and/or motion sensor(s) 710. The touch sensor(s) 708 may be configured to detect a touch on the device 702 by a user (e.g., a finger touching a display of the device 702, another object touching the display of the device 702, etc.). The motion sensor(s) 710 may be configured to detect motion (e.g., acceleration, deceleration, rotation, etc.) undergone by the device 702. The DPU driver software may utilize the touch sensor(s) 708 and/or the motion sensor(s) 710 to determine a touch event and/or a motion event occurring with respect to the device 702. The DPU driver software may utilize the detected touch event and/or motion event to adjust the temporal filtering. In one example, if the DPU driver software does not detect a touch event and/or a motion event after a 200 ms time period elapses, the DPU driver software may trigger partial frame update and DDIC scaling fallback. The aforementioned example may correspond to the device 702 being placed on a table. In another example, if the DPU driver software detects frequent touch events and/or motion events (e.g., if the DPU driver software detects at least one touch event and/or at least one motion event per a configured time period), the DPU driver software may trigger partial frame update and DDIC scaling fallback after 1000 ms elapses without a touch event and/or a motion event being detected. By detecting touch events and/or motion events, the DPU driver software may reduce a number of times that resolution scaling is switched from a DPU 706 of the device 702 to the DDIC 704 of the device 702, and vice versa.

The DPU driver software may reconfigure the DDIC 704 (i.e., a panel DDIC pipeline) to change (e.g., slow) a refresh rate of a display panel of the device 702 in order to facilitate the change in resolution scaling from the DPU 706 of the device 702 to the DDIC 704 of the device 702. The DPU driver software may notify the DDIC 704 to prepare for resolution scaling (i.e., "prepare for frame scaling up"). The DPU driver software may reconfigure the DPU 706 of the device (i.e., a host DPU pipeline) to transmit a frame at a low resolution to panel RAM (i.e., a framebuffer) of the DDIC 704. Furthermore, the DPU driver software may reconfigure the DPU 706 such that resolution scaling functionality of the DPU 706 is temporarily disabled. The DDIC 704 may update/refresh the frame using a DDIC hardware scaler of the DDIC 704, that is, the DDIC 704 may scale the frame from the low resolution to a high resolution via the DDIC hardware scaler. The DDIC 704 may output the scaled frame at the high resolution for display. For instance, the DDIC 704 may utilize a color map or a look up table in order to map pixel values from the scaled frame to pixel colors on a display, and the DDIC 704 may cause pixels on the display to emit light in accordance with the pixel colors.

In some aspects, the DPU driver software may switch to display panel DDIC resolution scaling when condition(s) are met. In an example, the condition(s) may include displaying graphical content in a split screen scenario (e.g., as in the first example 502), always-on display (AOD), and window video play (e.g., as in the second example 512). When the condition(s) are no longer met, the DPU driver software may switch back to DPU resolution scaling.

The DPU 706 may include a bus interface 712 that may enable the DPU 706 to communicate with other components of the device 702 (e.g., a CPU of the device 702, a GPU of the device 702, etc.). The DPU 706 may include hardware for latency buffering/detiling 714. Latency buffering/detiling 714 may help to account for any latency in a process, such as by adding any necessary buffering or detiling. The DPU 706 may include a video and graphics (VIG) pipe 716. The VIG pipe 716 may refer to a pipe that controls video and graphics functionality. The DPU 706 may include smart direct memory access (SDMA) 718. SDMA 718 may refer to directly accessing memory and sending data for display without scaling. The DPU 706 may include rotator direct memory access (DMA) 720. Rotator DMA 720 may refer to a DMA that may rotate a screen or that may include a rotating functionality. The DPU 706 may include functionality for rotate/writeback 722 (WB 0). The functionality for rotate/writeback 722 may include a rotation function and a writeback function. The DPU 706 may include crossbars 724. The crossbars 724 may include a crossbar switch functionality that allows the switching of multiple inputs and multiple outputs. The DPU 706 may include layer mixers 726. The layer mixers 726 may perform a per pixel mixing of pixels associated with different DMA operations and different VIG operations to produce a final output pixel. The DPU 706 may include destination surface processing pipes (DSPP) 728. The DSPP 728 may perform conversion, correction, and adjustment based on panel characteristics. The DPU 706 may include a display serial interface (DSI) 730. The DSI 730 may control the high-speed serial interface between a host processor and a display module. The DPU 706 may include a DisplayPort (DP)/USB Type-C interface 732. The DPU 706 may include WfD/writeback (WB2) 734. WfD/WB2 734 may help to control a writeback process, such as a storage method in which data is written into a cache each time a change occurs.

Figure 8A:
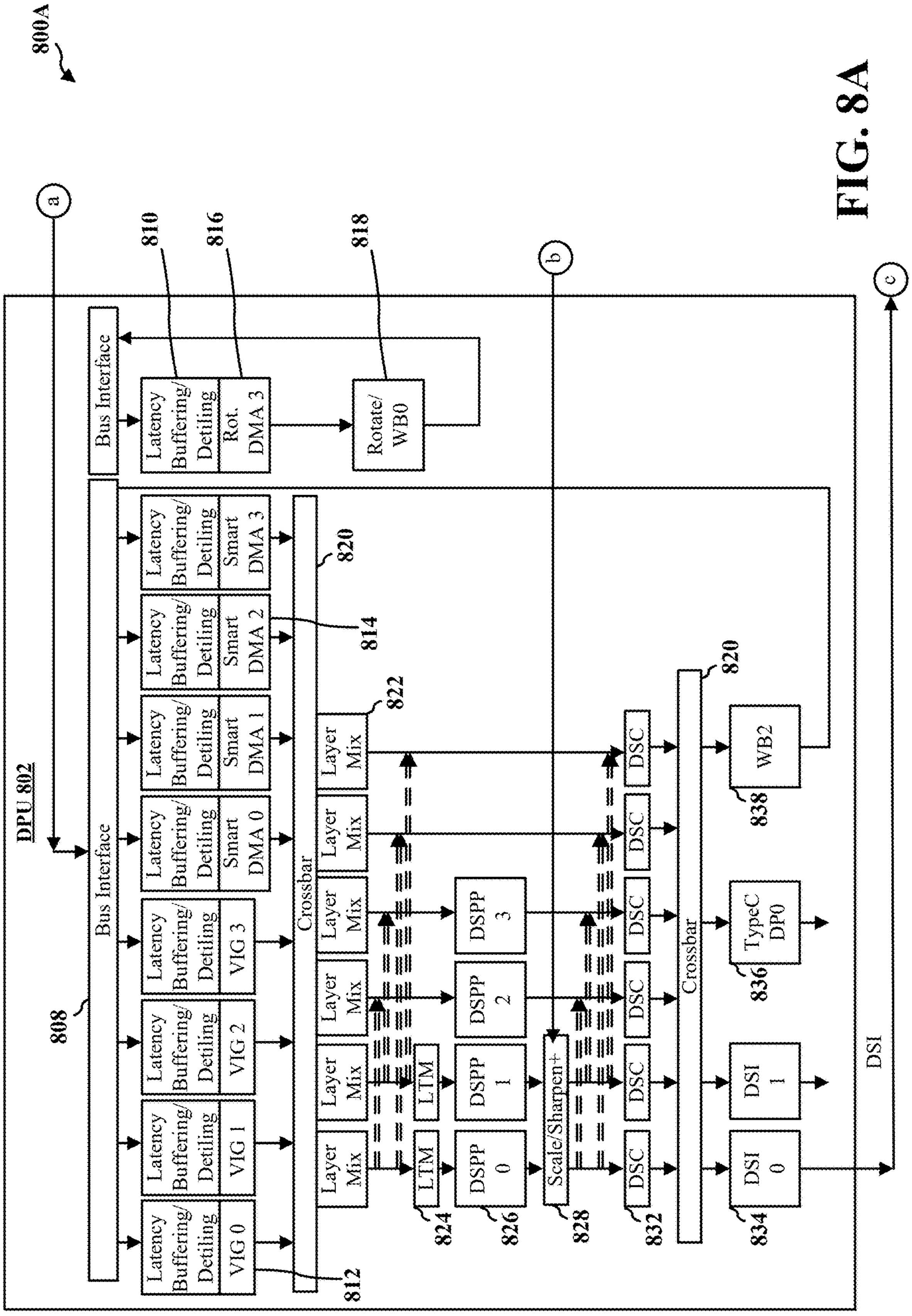
FIG. 8A is a diagram illustrating example aspects of a pipeline associated with partial frame update DDIC scaling in accordance with one or more techniques of this disclosure.
Figure 8B:
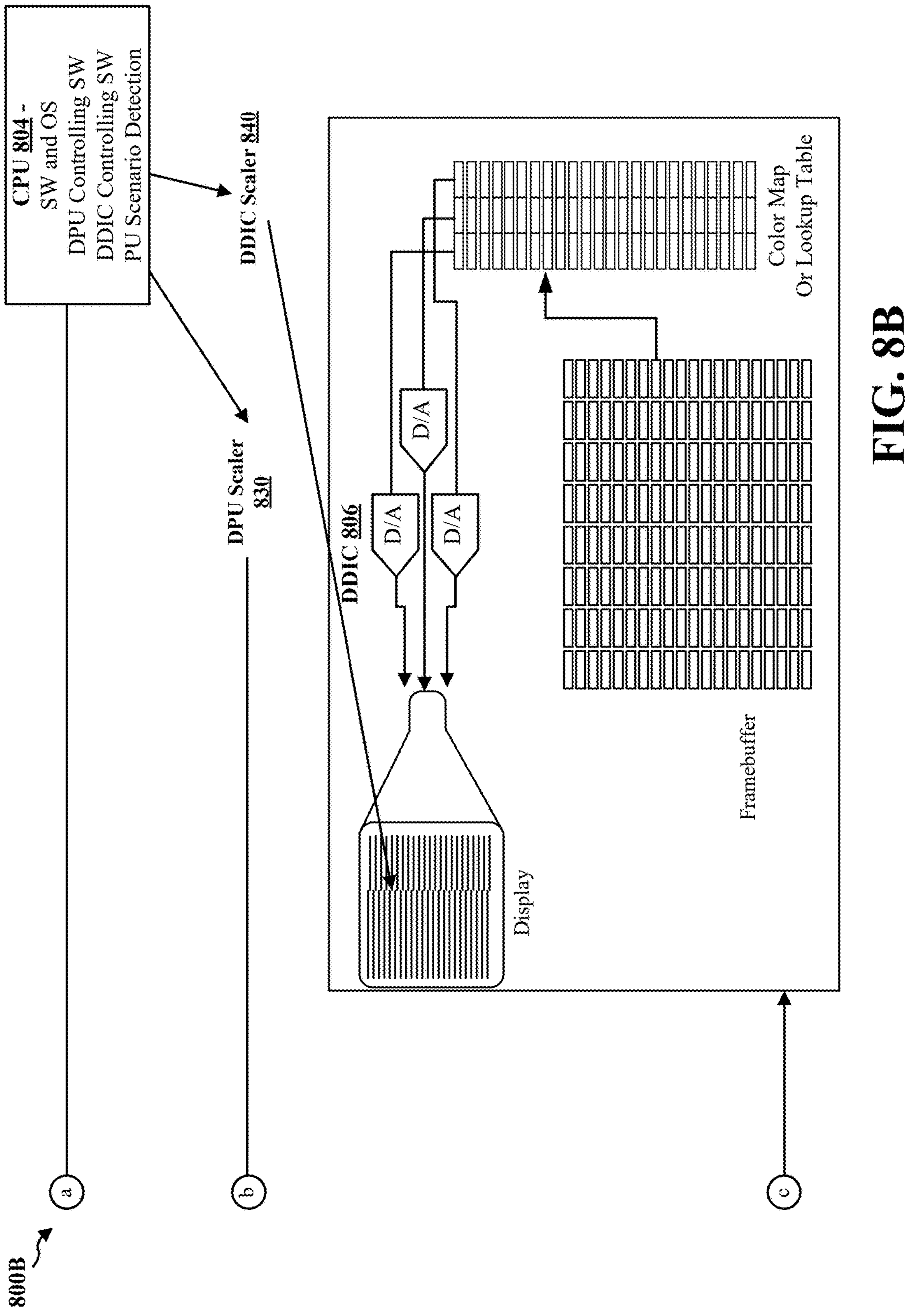
FIG. 8B is a diagram illustrating example aspects of a pipeline associated with partial frame update DDIC scaling in accordance with one or more techniques of this disclosure.

FIG. 8A is a diagram 800A illustrating example aspects of a pipeline associated with partial frame update DDIC scaling in accordance with one or more techniques of this disclosure. FIG. 8B is a diagram 800B illustrating example aspects of a pipeline associated with partial frame update DDIC scaling in accordance with one or more techniques of this disclosure. Referring jointly now to FIGS. 8A-8B, and as will be discussed in detail below, a device (e.g., a smartphone, the device 702, the device 104) may "fall back" to display panel DDIC resolution scaling while performing a partial frame update in order to provide partial frame update and resolution scaling concurrency. For instance, the aspects illustrated in the diagram 800A and the diagram 800B may be utilized to perform the functionality described above in the description of FIGS. 7A-7B.

A device may include a DPU 802, a CPU 804, and a DDIC 806. The CPU 804 may execute software and an OS. The software and/or the OS may include DPU controlling software for controlling the DPU 802, DDIC controlling software for controlling the DDIC 806, and software for detecting a partial frame update scenario.

The DPU 802 may include a bus interface 808 that may enable the DPU 802 to communicate with other components of a device (e.g., the CPU 804). The DPU 802 may include hardware for latency buffering/detiling 810. Latency buffering/detiling 810 may help to account for any latency in a process, such as by adding any necessary buffering or detiling. The DPU 802 may include a VIG pipe 812. The VIG pipe 812 may refer to a pipe that control video and graphics functionality. The DPU 802 may include SDMA 814. SDMA 814 may refer to directly accessing memory and sending data for display without scaling. The DPU 802 may include rotator DMA 816. The rotator DMA 816 may refer to a DMA that may rotate a screen or a DMA that may include a rotating functionality. The DPU 802 may include functionality for rotate/writeback 818 (WB 0). The functionality for rotate/writeback 818 may include a rotation function and a writeback function. The DPU 802 may include crossbars 820. The crossbars 820 may include a crossbar switch functionality that allows the switching of multiple inputs and multiple outputs. The DPU 802 may include layer mixers 822. The layer mixers 822 may perform a per pixel mixing of pixels associated with different DMA operations and different VIG operations to produce a final output pixel. The DPU 802 may include a local tone mapping (LTM) component 824. The LTM component 824 may allow for tone mapping to be performed locally at the DPU 802. The DPU 802 may include a DSPP 826. The DSPP 826 may perform conversion, correction, and adjustment based on panel characteristics. The DPU 802 may include functionality for scaling and sharpening 828. For instance, the DPU 802 may include a DPU scaler 830 that is configured to adjust resolutions of frames or portions of frames. For instance, the DPU scaler 830 may upscale a frame from a first resolution to a second resolution, where the second resolution is greater than the first resolution. The DPU 802 may include display stream compression (DSC) 832. The DPU 706 may include DSI 834. The DSI 834 may control a high-speed serial interface between a host processor and a display module. The DPU 802 may include a DP/USB Type-C interface 836. The DPU 802 may include WfD/writeback (WB2) 838. WfD/WB2 838 may help to control a writeback process, such as a storage method in which data is written into a cache each time a change occurs.

The DDIC 806 may include a DDIC scaler 840 (which may also be referred to as a DDIC hardware scaler). The DDIC scaler 840 may be configured to adjust resolutions of frames or portions of frames. For instance, the DDIC scaler 840 may upscale a frame from a first resolution to a second resolution, where the second resolution is greater than the first resolution. The CPU 804 may control the DDIC scaler 840 using the software and/or the OS of the device.

The above-described technologies may be associated with various advantages at a device (e.g., the device 104). First, a DDIC of a display panel may hold a full frame buffer. By using the DDIC to provide resolution scaling as a fallback (e.g., in partial frame update scenarios), the above-described technologies may reduce or eliminate complex border processing associated with reducing flicker. Second, using a DDIC of the display panel to facilitate resolution scaling for a partial frame update may reduce a power consumption of a device. As noted above, resolution scaling performed by a DPU may be associated with an increased visual quality in comparison to resolution scaling performed by a DDIC; however, resolution scaling performed by the DPU may be associated with increased power consumption in comparison to resolution scaling performed by the DDIC. By utilizing the above-described run time switching strategy between the DPU and the DDIC, the above-described technologies may provide a balance between visual quality and power consumption. Stated differently, the above-described technologies may be associated with a run time host DPU and panel DDIC scaling switching strategy that provides for partial frame update concurrently with resolution scaling. For instance, a device may utilize a host DPU of a device as a default resolution scaler or for full screen content and the device may utilize a panel DDIC resolution scaler for scenarios in which power consumption is to be reduced and/or for windowed content displayed on the device in which details are not easily perceived by a user due to a small size of the windowed content. Furthermore, using motion sensor data and touch sensor data to guide the aforementioned switching strategy may reduce flickering.

Figure 9:
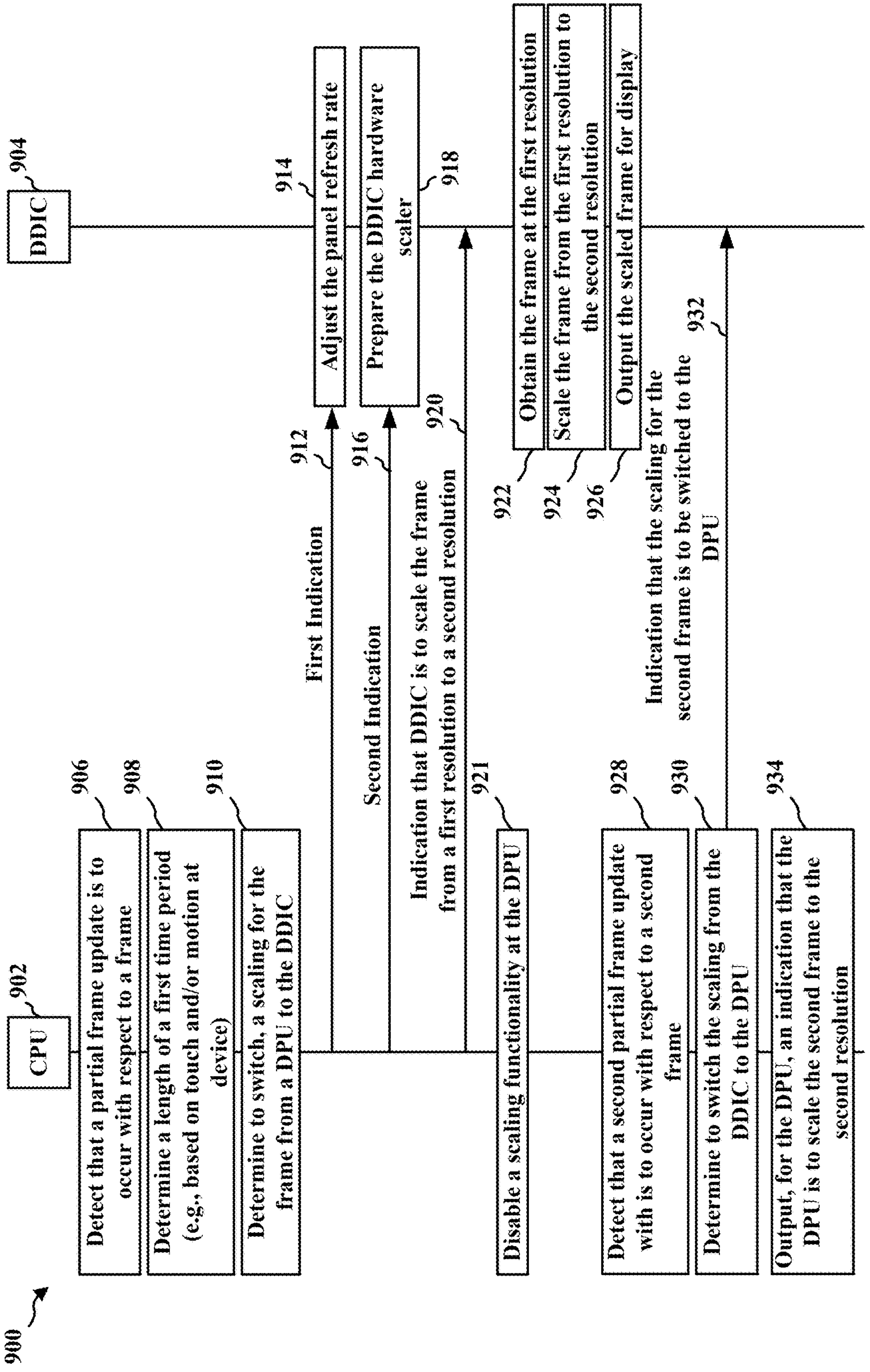
FIG. 9 is a call flow diagram illustrating example communications between a CPU and a DDIC in accordance with one or more techniques of this disclosure.

FIG. 9 is a call flow diagram 900 illustrating example communications between a CPU 902 and a DDIC 904 in accordance with one or more techniques of this disclosure. In an example, the CPU 902 and the DDIC 904 may be included in the device 104. In an example, the CPU 902 may execute DPU driver software in order to perform the communications.

At 906, the CPU 902 may detect that a partial frame update is to occur with respect to a frame. At 908, the CPU 902 may determine a length of a first time period that the CPU 902 is to wait before switching scaling for the frame from a DPU to the DDIC 904. In an example, the CPU 902 may determine the length of the first time period based on a user touch at the device 104 (e.g., as ascertained through a touch sensor) and/or motion of the device 104 (e.g., as ascertained through a motion sensor).

At 910, the CPU 902 may determine to switch scaling for the frame from the DPU to the DDIC 904 (e.g., after the first time period elapses). The frame may be at a first resolution. At 912, the CPU 902 may output, for the DDIC 904 and based on the determination at 910, a first indication that the DDIC 904 is to adjust a panel refresh rate (e.g., a refresh rate of the display(s) 131). At 916, the CPU 902 may output, for the DDIC 904 and based on the determination at 910, a second indication that the DDIC 904 is to prepare a DDIC hardware scaler of the DDIC 904 for subsequent scaling adjustments. At 914, the DDIC 904 may adjust the panel refresh rate based on the first indication. At 918, the DDIC 904 may prepare the DDIC hardware scaler for the subsequent scaling adjustments based on the second indication. At 920, the CPU 902 may output, for the DDIC 904 and based on the determination at 910, an indication that the DDIC is to scale the frame to a second resolution, where the second resolution is greater than or equal to the first resolution. The first resolution may be associated with an operating system of a device and the second resolution may be associated with a resolution of a panel of the device. In one aspect, the indication may include an indication of the first resolution and the second resolution. In another aspect, the indication may include an indication of the second resolution. In another aspect, the second resolution may be a default resolution, and as a result, the indication may not include an explicit indication of the first resolution or the second resolution; instead, the indication may indicate that the DDIC is to scale to the default resolution. At 921, the CPU 902 may disable (or adjust) a scaling functionality at the DPU based on the indication output at 920.

At 922, the DDIC 904 may obtain the frame at the first resolution. At 924, the DDIC 904 may scale the frame (e.g., via the DDIC hardware scaler) from the first resolution to the second resolution based on the indication output by the CPU 902 at 920. At 926, the DDIC 904 may output the frame for display at the second resolution.

Subsequently, at 928, the CPU 902 may detect that a second partial frame update with respect to a second frame is to occur, where the second frame is different from the frame, and where the second frame is to be displayed after the (scaled) frame. At 930, the CPU 902 may determine to switch (e.g., after a second time period) the scaling from the DDIC 904 to the DPU. At 932, the CPU 902 may output, for the DDIC 904, an indication that scaling for the second frame is to be switched to the DPU. At 934, the CPU 902 may output, for the DPU, an indication that the DPU is to scale the second frame.

Figure 10:
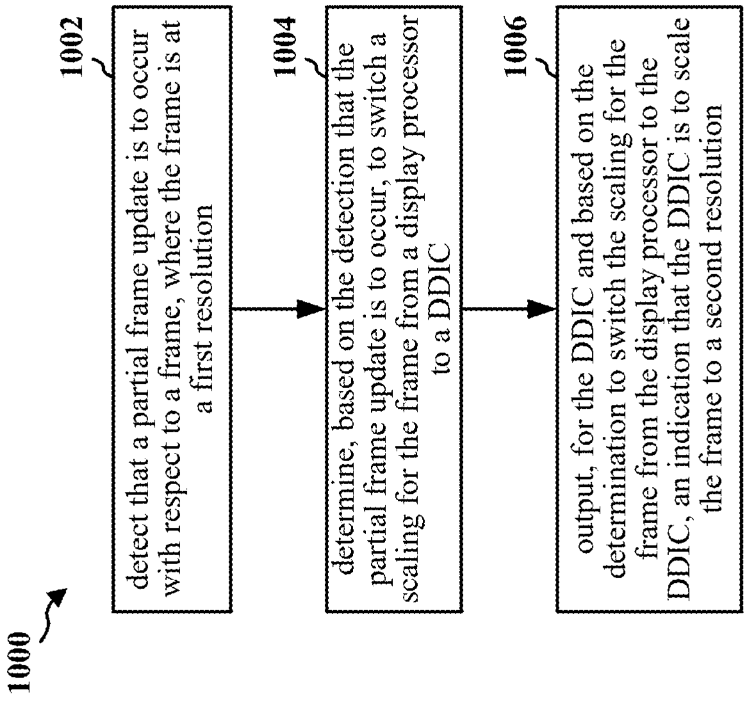
FIG. 10 is a flowchart of an example method of display processing in accordance with one or more techniques of this disclosure.

FIG. 10 is a flowchart 1000 of an example method of display processing in accordance with one or more techniques of this disclosure. The method may be performed by an apparatus, such as an apparatus for display processing, a CPU, driver software executed by the CPU, a wireless communication device, and the like, as used in connection with the aspects of FIGS. 1-6, 7A, 7B, 8A, 8B, and 9. In an example, the method may be performed by the DDIC fallback scaler 198.

At 1002, the apparatus (e.g., a CPU) detects that a partial frame update is to occur with respect to a frame, where the frame is at a first resolution. For example, FIG. 9 at 906 shows that the CPU 902 may detect a partial frame update. In an example, the partial frame update may correspond to a partial frame update as described in the description of FIG. 5. In an example, 1002 may be performed by the DDIC fallback scaler 198.

At 1004, the apparatus (e.g., a CPU) determines, based on the detection that the partial frame update is to occur, to switch a scaling for the frame from a display processor to a display driver integrated circuit (DDIC). For example, FIG. 9 at 910 shows that the CPU 902 may determine to switch a scaling for the frame from a DPU to the DDIC 904. In an example, the DDIC may be or include the DDIC 704 or the DDIC 806. In an example, the display processor may be or include the DPU 706, the DPU 802, a CPU, or a GPU. In an example, scaling the frame may include aspects described above in the description of FIGS. 4, 7A-7B, and/or 8A-8B. In an example, 1004 may be performed by the DDIC fallback scaler 198.

At 1006, the apparatus (e.g., a CPU) outputs, for the DDIC and based on the determination to switch the scaling for the frame from the display processor to the DDIC, an indication that the DDIC is to scale the frame to a second resolution. For example, FIG. 9 at 920 shows that the CPU 902 may output, for the DDIC 904 and based on the determination performed at 910, an indication that the DDIC 904 is to scale the frame from the first resolution to the second resolution. In an example, the first resolution may be 1080×2400 and the second resolution may be 1440×3200. In an example, 1006 may be performed by the DDIC fallback scaler 198.

Figure 11:
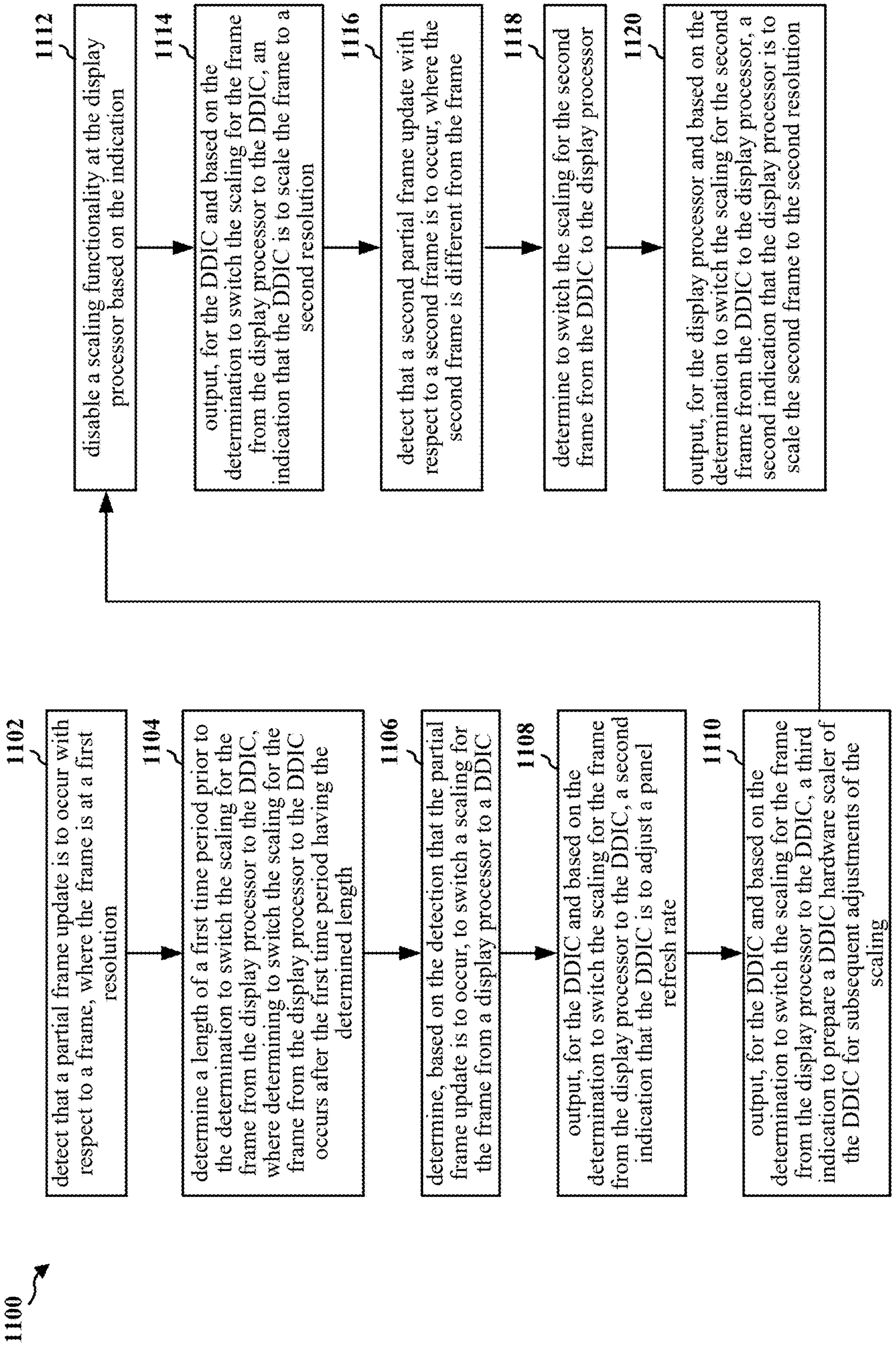
FIG. 11 is a flowchart of an example method of display processing in accordance with one or more techniques of this disclosure.

FIG. 11 is a flowchart 1100 of an example method of display processing in accordance with one or more techniques of this disclosure. The method may be performed by an apparatus, such as an apparatus for display processing, a CPU, driver software executed by the CPU, a wireless communication device, and the like, as used in connection with the aspects of FIGS. 1-6, 7A, 7B, 8A, 8B, and 9. In an example, the method (including the various aspects detailed below) may be performed by the DDIC fallback scaler 198.

At 1102, the apparatus (e.g., a CPU) detects that a partial frame update is to occur with respect to a frame, where the frame is at a first resolution. For example, FIG. 9 at 906 shows that the CPU 902 may detect a partial frame update. In an example, the partial frame update may correspond to a partial frame update as described in the description of FIG. 5. In an example, 1102 may be performed by the DDIC fallback scaler 198.

At 1106, the apparatus (e.g., a CPU) determines, based on the detection that the partial frame update is to occur, to switch a scaling for the frame from a display processor to a display driver integrated circuit (DDIC). For example, FIG. 9 at 910 shows that the CPU 902 may determine to switch a scaling for the frame from a DPU to the DDIC 904. In an example, the DDIC may be or include the DDIC 704 or the DDIC 806. In an example, the display processor may be or include the DPU 706, the DPU 802, a CPU, or a GPU. In an example, scaling the frame may include aspects described above in the description of FIGS. 4, 7A-7B, and/or 8A-8B. In an example, 1106 may be performed by the DDIC fallback scaler 198.

At 1114, the apparatus (e.g., a CPU) outputs, for the DDIC and based on the determination to switch the scaling for the frame from the display processor to the DDIC, an indication that the DDIC is to scale the frame to a second resolution. For example, FIG. 9 at 920 shows that the CPU 902 may output, for the DDIC 904 and based on the determination performed at 910, an indication that the DDIC 904 is to scale the frame from the first resolution to the second resolution. In an example, the first resolution may be 1080×2400 and the second resolution may be 1440×3200. In an example, 1114 may be performed by the DDIC fallback scaler 198.

In one aspect, at 1116, the apparatus (e.g., a CPU) may detect that a second partial frame update with respect to a second frame is to occur, where the second frame is different from the frame. For example, FIG. 9 at 928 shows that the CPU 902 may detect that a second partial frame update with respect to a second frame is to occur. In an example, 1116 may be performed by the DDIC fallback scaler 198.

In one aspect, at 1118, the apparatus (e.g., a CPU) may determine to switch the scaling for the second frame from the DDIC to the display processor. For example, FIG. 9 at 930 shows that the CPU 902 may determine to switch the scaling for the second frame from the DDIC 904 to the DPU. In an example, 1118 may be performed by the DDIC fallback scaler 198.

In one aspect, at 1120, the apparatus (e.g., a CPU) may output, for the display processor and based on the determination to switch the scaling for the second frame from the DDIC to the display processor, a second indication that the display processor is to scale the second frame to the second resolution. For example, FIG. 9 at 934 shows that the CPU 902 may output, for the DPU, an indication that the DPU is to scale the second frame from the first resolution to the second resolution. In an example, 1120 may be performed by the DDIC fallback scaler 198.

In one aspect, the second resolution may be greater than or equal to the first resolution. For example, the second resolution may be 1440×3200 and the first resolution may be 1080×2400.

In one aspect, at 1104, the apparatus (e.g., a CPU) may determine a length of a first time period prior to the determination to switch the scaling for the frame from the display processor to the DDIC, where determining to switch the scaling for the frame from the display processor to the DDIC may occur after the first time period having the determined length. For example, FIG. 9 at 908 shows that the CPU 902 may determine a length of a first time period. In an example, determining the length of the first time period may include aspects described above in connection with FIGS. 7A-7B and/or FIGS. 8A-8B. In an example, 1104 may be performed by the DDIC fallback scaler 198.

In one aspect, the length of the first time period may be determined based on at least one of: a user touch at a device or at least one motion sensor at the device. For example, FIG. 9 shows that the length of the first time period may be determined based on a user touch at a device and/or motion at the device. In another example, FIGS. 7A-7B show that the length of the first time period may be determined based on touch or motion at the device 702.

In one aspect, the device may include a first panel and a second panel, and the partial frame update may be associated with the first panel. For example, the first display panel may be the first display panel 506 and the second display panel may be the second display panel 508.

In one aspect, at 1108, the apparatus (e.g., a CPU) may output, for the DDIC and based on the determination to switch the scaling for the frame from the display processor to the DDIC, a second indication that the DDIC is to adjust a panel refresh rate. For example, FIG. 9 at 912 shows that the CPU 902 may output an indication that the DDIC 904 is to adjust a panel refresh rate. In an example, 1108 may be performed by the DDIC fallback scaler 198.

In one aspect, at 1110, the apparatus (e.g., a CPU) may output, for the DDIC and based on the determination to switch the scaling for the frame from the display processor to the DDIC, a third indication to prepare a DDIC hardware scaler of the DDIC for subsequent adjustments of the scaling. For example, FIG. 9 at 916 shows that the CPU 902 may output, for the DDIC 904, an indication to prepare a DDIC hardware scaler of the DDIC for subsequent adjustments of scaling. In an example, the DDIC hardware scaler may be or include the DDIC scaler 840. In an example, 1110 may be performed by the DDIC fallback scaler 198.

In one aspect, at 1112, the apparatus (e.g., a CPU) may disable a scaling functionality at the DPU based on the indication. For example, FIG. 9 at 921 shows that the CPU 902 may disable a scaling functionality at the DPU based on the indication output at 920. In an example, 1112 may be performed by the DDIC fallback scaler 198.

Figure 12:
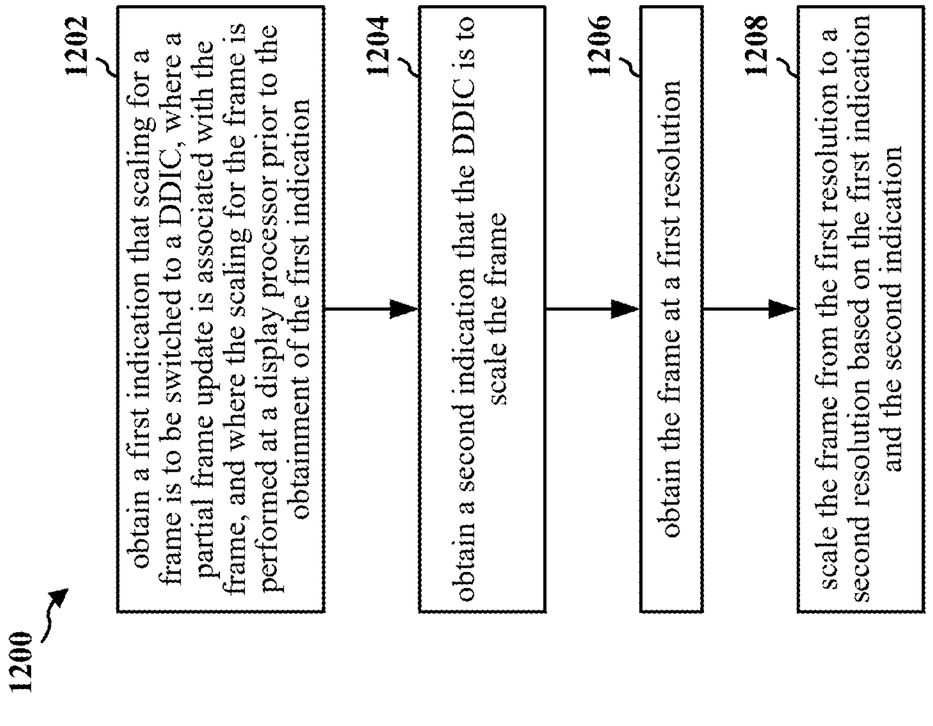
FIG. 12 is a flowchart of an example method of display processing in accordance with one or more techniques of this disclosure.

FIG. 12 is a flowchart 1200 of an example method of display processing in accordance with one or more techniques of this disclosure. The method may be performed by an apparatus, such as an apparatus for display processing, a DDIC, and the like, as used in connection with the aspects of FIGS. 1-6, 7A, 7B, 8A, 8B, and 9. In an example, the method may be performed by the DDIC scaler 840.

At 1202, the apparatus (e.g., a DDIC) obtains a first indication that scaling for a frame is to be switched to a DDIC, where a partial frame update is associated with the frame, and where the scaling for the frame is performed at a display processor prior to the obtainment of the first indication. For example, obtaining the first indication may include obtaining the first indication at 912 in FIG. 9 and obtaining the second indication at 916 in FIG. 9. In an example, the display processor may be or include the DPU 706, the DPU 802, a GPU, or a CPU. In an example, the partial frame update may correspond to a partial frame update as described in the description of FIG. 5. In an example, 1202 may be performed by the DDIC scaler 840.

At 1204, the apparatus (e.g., a DDIC) obtains a second indication that the DDIC is to scale the frame. For example, FIG. 9 at 920 shows that the DDIC 904 may obtain an indication that the DDIC 904 is to scale the frame from a first resolution to a second resolution. In an example, the DDIC may be or include the DDIC 704 or the DDIC 806. In an example, the first resolution may be 1080×2400 and the second resolution may be 1440×3200. In an example, 1204 may be performed by the DDIC scaler 840.

At 1206, the apparatus (e.g., a DDIC) obtains the frame at a first resolution. For example, FIG. 9 at 922 shows that the DDIC 904 may obtain a frame at a first resolution. In an example, 1206 may be performed by the DDIC scaler 840.

At 1208, the apparatus (e.g., a DDIC) scales the frame from the first resolution to a second resolution based on the first indication and the second indication. For example, FIG. 9 at 924 shows that the DDIC 904 may scale the frame from the first resolution to the second resolution. In an example, 1208 may be performed by the DDIC scaler 840.

Figure 13:
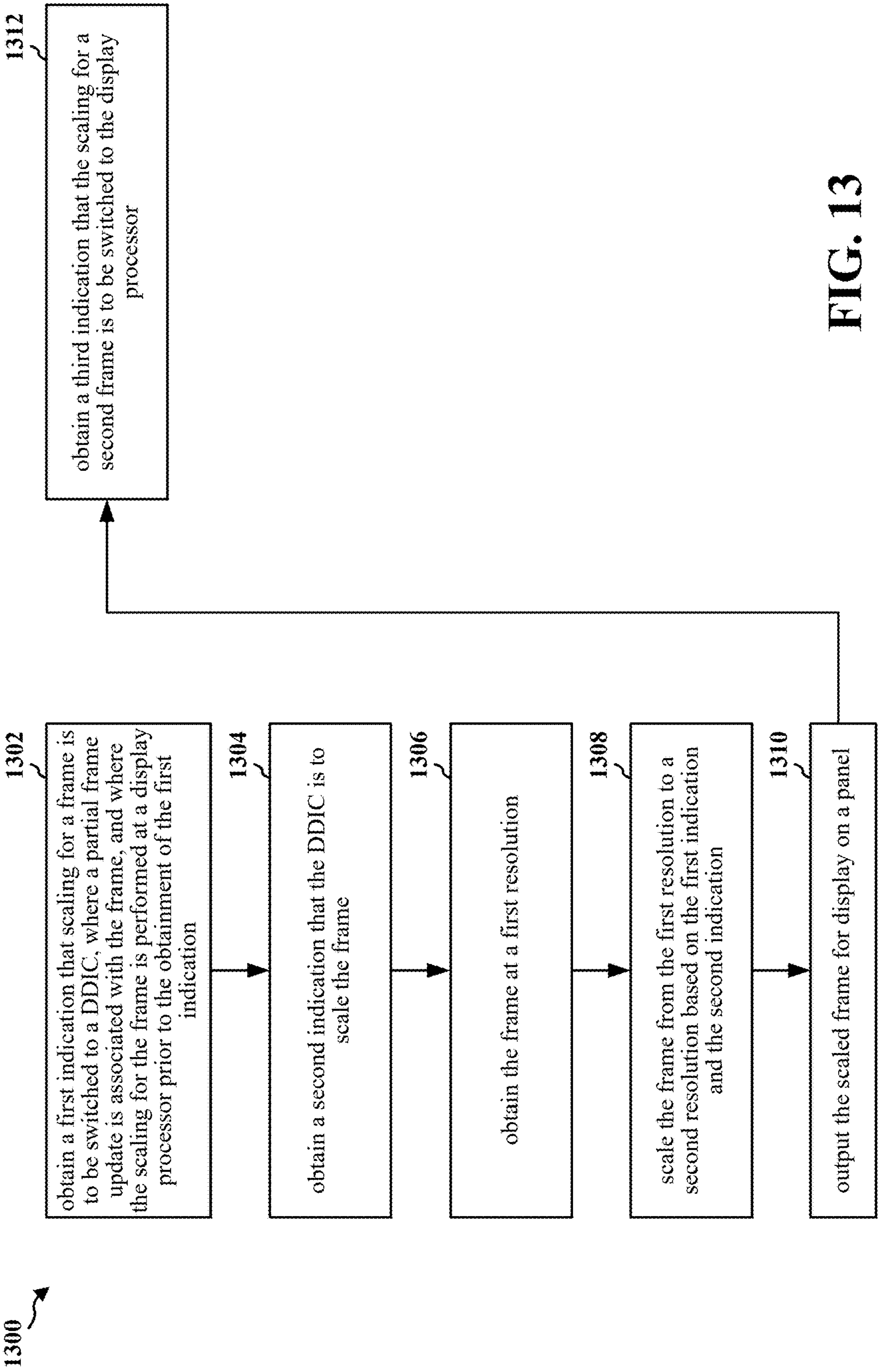
FIG. 13 is a flowchart of an example method of display processing in accordance with one or more techniques of this disclosure.

FIG. 13 is a flowchart 1300 of an example method of display processing in accordance with one or more techniques of this disclosure. The method may be performed by an apparatus, such as an apparatus for display processing, a DDIC, and the like, as used in connection with the aspects of FIGS. 1-6, 7A, 7B, 8A, 8B, and 9. In an example, the method (including the various aspects detailed below) may be performed by the DDIC scaler 840.

At 1302, the apparatus (e.g., a DDIC) obtains a first indication that scaling for a frame is to be switched to a DDIC, where a partial frame update is associated with the frame, and where the scaling for the frame is performed at a display processor prior to the obtainment of the first indication. For example, obtaining the first indication may include obtaining the first indication at 912 in FIG. 9 and obtaining the second indication at 916 in FIG. 9. In an example, the display processor may be or include the DPU 706, the DPU 802, a GPU, or a CPU. In an example, the partial frame update may correspond to a partial frame update as described in the description of FIG. 5. In an example, 1302 may be performed by the DDIC scaler 840.

At 1304, the apparatus (e.g., a DDIC) obtains a second indication that the DDIC is to scale the frame. For example, FIG. 9 at 920 shows that the DDIC 904 may obtain an indication that the DDIC 904 is to scale the frame from a first resolution to a second resolution. In an example, the DDIC may be or include the DDIC 704 or the DDIC 806. In an example, the first resolution may be 1080×2400 and the second resolution may be 1440×3200. In an example, 1304 may be performed by the DDIC scaler 840.

At 1306, the apparatus (e.g., a DDIC) obtains the frame at a first resolution. For example, FIG. 9 at 922 shows that the DDIC 904 may obtain a frame at a first resolution. In an example, 1306 may be performed by the DDIC scaler 840.

At 1308, the apparatus (e.g., a DDIC) scales the frame from the first resolution to a second resolution based on the first indication and the second indication. For example, FIG. 9 at 924 shows that the DDIC 904 may scale the frame from the first resolution to the second resolution. In an example, 1308 may be performed by the DDIC scaler 840.

In one aspect, at 1312, the apparatus (e.g., a DDIC) may obtain a third indication that the scaling for a second frame is to be switched to the display processor. For example, FIG. 9 at 932 shows that the DDIC 904 may obtain an indication that scaling for a second frame is to be switched from the DDIC 904 to the DPU. In an example, 1312 may be performed by the DDIC scaler 840.

In one aspect, the second resolution may be greater than or equal to the first resolution. For example, the second resolution may be 1440×3200 and the first resolution may be 1080×2400.

In one aspect, the first indication may correspond to a time period, and the time period may be associated with at least one of a user touch at a device or at least one motion sensor at the device. For example, the time period may correspond to the time period determined by the CPU 902 at 908. In another example, FIGS. 7A-7B show that the time period may be associated with a touch and/or motion at the device 702.

In one aspect, the device may include a first panel and a second panel, and the partial frame update may be associated with the first panel. For example, the first display panel may be the first display panel 506 and the second display panel may be the second display panel 508.

In one aspect, obtaining the first indication that the scaling for the frame is to be switched from the DPU to the DDIC may include: obtaining a third indication that the DDIC is to adjust a panel refresh rate. For example, FIG. 9 at 912 shows that the DDIC 904 may obtain an indication that the DDIC 904 is to adjust a panel refresh rate.

In one aspect, obtaining the first indication that the scaling for the frame is to be switched from the DPU to the DDIC may further include adjusting the panel refresh rate based on the third indication. For example, FIG. 9 at 914 shows that the DDIC 904 may adjust a panel refresh rate based on the indication obtained at 912.

In one aspect, obtaining the first indication that the scaling for the frame is to be switched from the DPU to the DDIC may further include: obtaining a fourth indication to prepare a DDIC hardware scaler of the DDIC for subsequent adjustments of the scaling. For example, FIG. 9 at 916 shows that the DDIC 904 may obtain an indication to prepare a DDIC hardware scaler for subsequent scaling adjustments.

In one aspect, obtaining the first indication that the scaling for the frame is to be switched from the DPU to the DDIC may further include preparing the DDIC hardware scaler of the DDIC for the subsequent adjustments of the scaling based on the fourth indication. For example, FIG. 9 at 918 shows that the DDIC 904 may prepare a DDIC hardware scaler for subsequent adjustments of scaling based on the indication obtained at 916.

In one aspect, at 1310, the apparatus (e.g., a DDIC) may output the scaled frame for display on a panel. For example, FIG. 9 at 924 shows that the DDIC 904 may output the frame scaled at 924 for display on a panel. In an example, the panel may be or include the first display panel 506, the second display panel 508, or the display panel 514. In an example, 1310 may be performed by the DDIC scaler 840.

In one aspect, the first resolution may be associated with an operating system, and the second resolution may be associated with a resolution of a panel. For example, the first resolution may be the OS resolution 604 and the second resolution may be the physical display resolution 606.

In configurations, a method or an apparatus for display processing is provided. The apparatus may be a DPU, a display processor, or some other processor that may perform display processing. In aspects, the apparatus may be the display processor 127 within the device 104, or may be some other hardware within the device 104 or another device. The apparatus may include means for detecting that a partial frame update is to occur with respect to a frame, where the frame is at a first resolution. The apparatus may further include means for determining, based on the detection that the partial frame update is to occur, to switch a scaling for the frame from a display processor to a display driver integrated circuit (DDIC). The apparatus may include means for outputting, for the DDIC and based on the determination to switch the scaling for the frame from the display processor to the DDIC, an indication that the DDIC is to scale the frame to a second resolution. The apparatus may include means for detecting that a second partial frame update with respect to a second frame is to occur, where the second frame is different from the frame. The apparatus may include means for determining to switch the scaling for the second frame from the DDIC to the display processor. The apparatus may include means for outputting, for the display processor and based on the determination to switch the scaling for the second frame from the DDIC to the display processor, a second indication that the display processor is to scale the second frame to the second resolution. The apparatus may include means for determining a length of a first time period prior to the determination to switch the scaling for the frame from the display processor to the DDIC, where determining to switch the scaling for the frame from the display processor to the DDIC occurs after the first time period having the determined length. The apparatus may include means for disabling a scaling functionality at the display processor based on the indication. The apparatus may include means for outputting, for the DDIC and based on the determination to switch the scaling for the frame from the display processor to the DDIC, a second indication that the DDIC is to adjust a panel refresh rate. The apparatus may include means for outputting, for the DDIC and based on the determination to switch the scaling for the frame from the display processor to the DDIC, a third indication to prepare a DDIC hardware scaler of the DDIC for subsequent adjustments of the scaling.

In configurations, a method or an apparatus for display processing is provided. The apparatus may be a DDIC, such as the DDIC 904 or the DDIC scaler 840. The apparatus may include means for obtaining a first indication that scaling for a frame is to be switched to a display driver integrated circuit (DDIC), where a partial frame update is associated with the first frame, and where the scaling for the frame is performed at a display processor prior to the obtainment of the first indication. The apparatus may further include means for obtaining a second indication that the DDIC is to scale the frame. The apparatus may include means for obtaining the frame at a first resolution. The apparatus may include means for scaling the frame from the first resolution to a second resolution based on the first indication and the second indication. The apparatus may include means for obtaining a third indication that the scaling for a second frame is to be switched to the display processor. The apparatus may include means for outputting the scaled frame for display on a panel.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of display processing, including: detecting that a partial frame update is to occur with respect to a frame, where the frame is at a first resolution; determining, based on the detection that the partial frame update is to occur, to switch a scaling for the frame from a display processor to a display driver integrated circuit (DDIC); and outputting, for the DDIC and based on the determination to switch the scaling for the frame from the display processor to the DDIC, an indication that the DDIC is to scale the frame to a second resolution.

Aspect 2 may be combined with aspect 1 and further includes detecting that a second partial frame update with respect to a second frame is to occur, where the second frame is different from the frame; and determining to switch the scaling for the second frame from the DDIC to the display processor.

Aspect 3 may be combined with aspect 2 and further includes outputting, for the display processor and based on the determination to switch the scaling for the second frame from the DDIC to the display processor, a second indication that the display processor is to scale the second frame to the second resolution.

Aspect 4 may be combined with any of aspects 1-3 and includes that the second resolution is greater than or equal to the first resolution.

Aspect 5 may be combined with any of aspects 1-4 and further includes determining a length of a first time period prior to the determination to switch the scaling for the frame from the display processor to the DDIC, where determining to switch the scaling for the frame from the display processor to the DDIC occurs after the first time period having the determined length.

Aspect 6 may be combined with aspect 5 and includes that the length of the first time period is determined based on at least one of: a user touch at a device or at least one motion sensor at the device.

Aspect 7 may be combined with aspect 6 and includes that the device includes a first panel and a second panel, and where the partial frame update is associated with the first panel.

Aspect 8 may be combined with any of aspects 1-7 and further includes: outputting, for the DDIC and based on the determination to switch the scaling for the frame from the display processor to the DDIC, a second indication that the DDIC is to adjust a panel refresh rate.

Aspect 9 may be combined with aspect 8 and further includes: outputting, for the DDIC and based on the determination to switch the scaling for the frame from the display processor to the DDIC, a third indication to prepare a DDIC hardware scaler of the DDIC for subsequent adjustments of the scaling.

Aspect 10 may be combined with any of aspects 1-9 and further includes disabling a scaling functionality at the display processor based on the indication.

Aspect 11 is an apparatus for display processing including at least one processor coupled to a memory and, based at least in part on information stored in the memory, the at least one processor is configured implement a method as in any of aspects 1-10.

Aspect 12 may be combined with aspect 11 and includes that the apparatus is a wireless communication device including at least one of a transceiver or an antenna coupled to the at least one processor, where the at least one processor is configured to obtain the frame via at least one of the transceiver or the antenna.

Aspect 13 is an apparatus for display processing including means for implementing a method as in any of aspects 1-10.

Aspect 14 is a computer-readable medium (e.g., a non-transitory computer-readable medium) storing computer executable code, the computer executable code when executed by at least one processor causes the at least one processor to implement a method as in any of aspects 1-10.

Aspect 15 is a method of display processing, including: obtaining a first indication that scaling for a frame is to be switched to a display driver integrated circuit (DDIC), where a partial frame update is associated with the first frame, and where the scaling for the frame is performed at a display processor prior to the obtainment of the first indication; obtaining a second indication that the DDIC is to scale the frame; obtaining the frame at a first resolution; and scaling the frame from the first resolution to a second resolution based on the first indication and the second indication.

Aspect 16 may be combined with aspect 15 and further includes obtaining a third indication that the scaling for a second frame is to be switched to the display processor.

Aspect 17 may be combined with any of aspects 15-16 and includes that the second resolution is greater than or equal to the first resolution.

Aspect 18 may be combined with any of aspects 15-17 and includes that the first indication corresponds to a time period, and where the time period is associated with at least one of a user touch at a device or at least one motion sensor at the device.

Aspect 19 may be combined with aspect 18 and includes that the device includes a first panel and a second panel, and where the partial frame update is associated with the first panel.

Aspect 20 may be combined with any of aspects 15-19 and includes that obtaining the first indication that the scaling for the frame is to be switched to the DDIC includes: obtaining a third indication that the DDIC is to adjust a panel refresh rate; and adjusting the panel refresh rate based on the third indication.

Aspect 21 may be combined with aspect 20 and includes that obtaining the first indication that the scaling for the frame is to be switched to the DDIC further includes: obtaining a fourth indication to prepare a DDIC hardware scaler of the DDIC for subsequent adjustments of the scaling; and preparing the DDIC hardware scaler of the DDIC for the subsequent adjustments of the scaling based on the fourth indication.

Aspect 22 may be combined with any of aspects 15-21 and further includes outputting the scaled frame for display on a panel.

Aspect 23 may be combined with any of aspects 15-22 and includes that the first resolution is associated with an operating system, and where the second resolution is associated with a resolution of a panel.

Aspect 24 is an apparatus for display processing including at least one processor coupled to a memory and, based at least in part on information stored in the memory, the at least one processor is configured implement a method as in any of aspects 15-23.

Aspect 25 may be combined with aspect 24 and includes that the apparatus is a wireless communication device including at least one of a transceiver or an antenna coupled to the at least one processor, where to obtain the frame at the first resolution, the at least one processor is configured to obtain the frame at the first resolution via at least of the transceiver or the antenna.

Aspect 26 is an apparatus for display processing including means for implementing a method as in any of aspects 15-23.

Aspect 27 is a computer-readable medium (e.g., a non-transitory computer-readable medium) storing computer executable code, the computer executable code when executed by at least one processor causes the at least one processor to implement a method as in any of aspects 15-23.

Various aspects have been described herein. These and other aspects are within the scope of the following claims.

What is claimed is:

1. An apparatus for display processing, comprising:

a memory; and at least one processor coupled to the memory and, based at least in part on information stored in the memory, the at least one processor is configured to:

detect that a partial frame update is to occur with respect to a frame, wherein the frame is at a first resolution;

determine, based on the detection that the partial frame update is to occur, to switch a scaling for the frame from a display processor to a display driver integrated circuit (DDIC); and output, for the DDIC and based on the determination to switch the scaling for the frame from the display processor to the DDIC, an indication that the DDIC is to scale the frame to a second resolution.

2. The apparatus of claim 1, wherein the at least one processor is further configured to:

detect that a second partial frame update with respect to a second frame is to occur, wherein the second frame is different from the frame; and determine to switch the scaling for the second frame from the DDIC to the display processor.

3. The apparatus of claim 2, wherein the at least one processor is further configured to:

output, for the display processor and based on the determination to switch the scaling for the second frame from the DDIC to the display processor, a second indication that the display processor is to scale the second frame to the second resolution.

4. The apparatus of claim 1, wherein the second resolution is greater than or equal to the first resolution.

5. The apparatus of claim 1, wherein the at least one processor is further configured to:

determine a length of a first time period prior to the determination to switch the scaling for the frame from the display processor to the DDIC, wherein to determine to switch the scaling for the frame from the display processor to the DDIC, the at least one processor is configured to determine, after the first time period having the determined length, to switch the scaling for the frame from the display processor to the DDIC.

6. The apparatus of claim 5, wherein to determine the length of the first time period, the at least one processor is configured to determine the length of the first time period based on at least one of: a user touch at a device or at least one motion sensor at the device.

7. The apparatus of claim 6, wherein the device comprises a first panel and a second panel, and wherein the partial frame update is associated with the first panel.

8. The apparatus of claim 1, wherein the at least one processor is further configured to:

output, for the DDIC and based on the determination to switch the scaling for the frame from the display processor to the DDIC, a second indication that the DDIC is to adjust a panel refresh rate.

9. The apparatus of claim 8, wherein the at least one processor is further configured to:

output, for the DDIC and based on the determination to switch the scaling for the frame from the display processor to the DDIC, a third indication to prepare a DDIC hardware scaler of the DDIC for subsequent adjustments of the scaling.

10. The apparatus of claim 1, wherein the at least one processor is further configured to:

disable a scaling functionality at the display processor based on the indication.

11. The apparatus of claim 1, further comprising a wireless communication device comprising at least one of a transceiver or an antenna coupled to the at least one processor, and wherein the at least one processor is further configured to obtain the frame via at least one of the transceiver or the antenna.

12. An apparatus for display processing, comprising:

a memory; and at least one processor coupled to the memory and, based at least in part on information stored in the memory, the at least one processor is configured to:

obtain a first indication that scaling for a frame is to be switched to a display driver integrated circuit (DDIC), wherein a partial frame update is associated with the first frame, and wherein the scaling for the frame is performed at a display processor prior to the obtainment of the first indication;

obtain a second indication that the DDIC is to scale the frame;

obtain the frame at a first resolution; and scale the frame from the first resolution to a second resolution based on the first indication and the second indication.

13. The apparatus of claim 12, wherein the at least one processor is further configured to:

obtain a third indication that the scaling for a second frame is to be switched to the display processor.

14. The apparatus of claim 12, wherein the second resolution is greater than or equal to the first resolution.

15. The apparatus of claim 12, wherein the first indication corresponds to a time period, and wherein the time period is associated with at least one of a user touch at a device or at least one motion sensor at the device.

16. The apparatus of claim 15, wherein the device comprises a first panel and a second panel, and wherein the partial frame update is associated with the first panel.

17. The apparatus of claim 12, wherein to obtain the first indication that the scaling for the frame is to be switched to the DDIC, the at least one processor is configured to:

obtain a third indication that the DDIC is to adjust a panel refresh rate; and adjust the panel refresh rate based on the third indication.

18. The apparatus of claim 17, wherein to obtain the first indication that the scaling for the frame is to be switched to the DDIC, the at least one processor is further configured to:

obtain a fourth indication to prepare a DDIC hardware scaler of the DDIC for subsequent adjustments of the scaling; and prepare the DDIC hardware scaler of the DDIC for the subsequent adjustments of the scaling based on the fourth indication.

19. The apparatus of claim 12, wherein the at least one processor is further configured to:

output the scaled frame for display on a panel.

20. The apparatus of claim 12, wherein the first resolution is associated with an operating system, and wherein the second resolution is associated with a resolution of a panel.

* * * * *